United States Patent
Sheng

(10) Patent No.: US 8,587,721 B2
(45) Date of Patent: Nov. 19, 2013

(54) CIRCUITRY AND TECHNIQUES TO ASYNCHRONOUSLY PROCESS, OUTPUT AND/OR DISPLAY DIGITAL VIDEO DATA OF A BROADCAST

(75) Inventor: Samuel Sheng, Los Gatos, CA (US)

(73) Assignee: Telegent Systems, Inc., Sunnyvale, CA (US)

( * ) Notice: Subject to any disclaimer, the term of this patent is extended or adjusted under 35 U.S.C. 154(b) by 332 days.

(21) Appl. No.: 12/850,540

(22) Filed: Aug. 4, 2010

(65) Prior Publication Data

US 2011/0032364 A1    Feb. 10, 2011

Related U.S. Application Data

(60) Provisional application No. 61/231,861, filed on Aug. 6, 2009.

(51) Int. Cl.

| | | |
|---|---|---|
| H04N 5/04 | (2006.01) | |
| H04N 9/44 | (2006.01) | |
| H04N 7/00 | (2011.01) | |
| H04N 11/00 | (2006.01) | |
| H04N 7/04 | (2006.01) | |
| H04N 11/06 | (2006.01) | |
| H04N 17/00 | (2006.01) | |
| H04N 17/02 | (2006.01) | |
| H04N 7/12 | (2006.01) | |
| H04N 11/02 | (2006.01) | |
| H04N 11/04 | (2006.01) | |
| G06K 9/36 | (2006.01) | |

(52) U.S. Cl.
USPC ........... 348/500; 348/497; 348/495; 348/184; 348/180; 375/240.28; 382/232; 345/629

(58) Field of Classification Search
None
See application file for complete search history.

(56) References Cited

U.S. PATENT DOCUMENTS 5,652,627 A * 7/1997 Allen ............................. 348/497
7,403,660 B2 * 7/2008 Hannuksela ................... 382/232

(Continued)

FOREIGN PATENT DOCUMENTS

EP    1 515 467    3/2005

*Primary Examiner* — Jefferey Harold
*Assistant Examiner* — Sean Haiem
(74) *Attorney, Agent, or Firm* — Richard T. Ogawa; Ogawa P.C.

(57) ABSTRACT

A method and circuitry for processing a video signal corresponding to a source synchronous video broadcast which corresponds to a selected channel which is one of a plurality of channels of a broadcast spectrum. In one aspect, the method includes generating digitized data of the video signal, which corresponds to the source synchronous video broadcast, using a local clock signal having a frequency which is different from the frequency of the source clock of the video broadcast; generating video data using the digitized data of the video signal; generating formatted video data blocks by arranging the video data into one or more lines or frames of video data; generating temporal reference signals wherein each temporal reference signal is associated with at least one formatted video data block. The video processing device, in one aspect, includes circuitry to convert the video signal of the source synchronous video broadcast to a baseband video signal; clock generation circuitry to generate a local clock signal; processing circuitry to: (i) asynchronously, with respect to the source clock, digitize the baseband video signal using the local clock signal, wherein the local clock signal includes a frequency which is different from the frequency of the source clock, and (ii) generate video data using the digitized data which corresponds to the video signal of the broadcast; and output format circuitry to generate formatted video data blocks by arranging the video data into one or more lines or frames of video data.

40 Claims, 20 Drawing Sheets

(56) References Cited

U.S. PATENT DOCUMENTS

| | | | |
|---|---|---|---|
| 2004/0062314 A1* | 4/2004 | Demas et al. | 375/240.28 |
| 2004/0073930 A1 | 4/2004 | Demas | |
| 2004/0218816 A1* | 11/2004 | Hannuksela | 382/232 |
| 2006/0268012 A1* | 11/2006 | MacInnis et al. | 345/629 |
| 2007/0183499 A1 | 8/2007 | Kimata | |
| 2008/0147678 A1 | 6/2008 | Peters | |

* cited by examiner

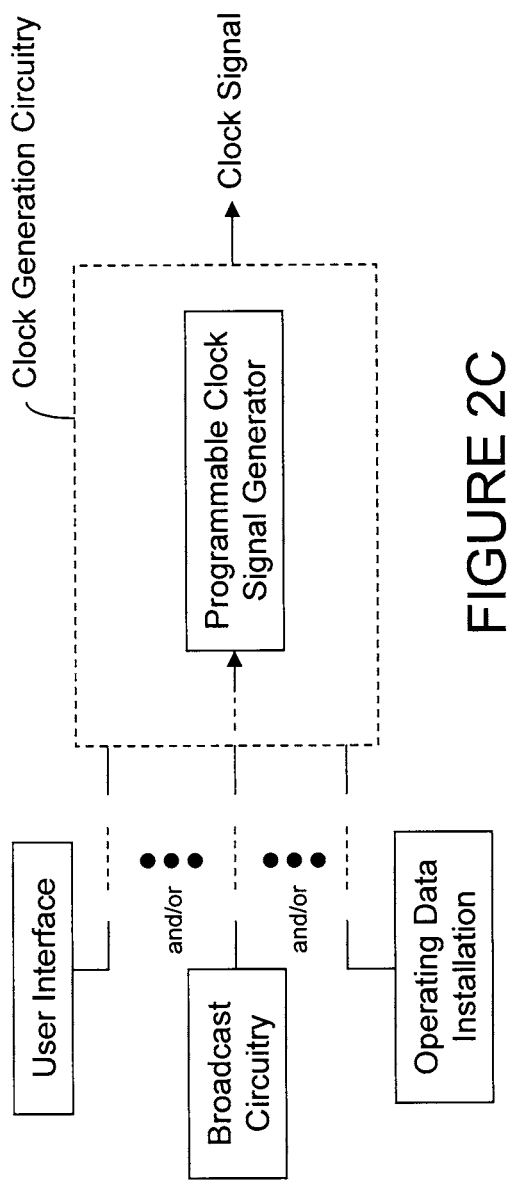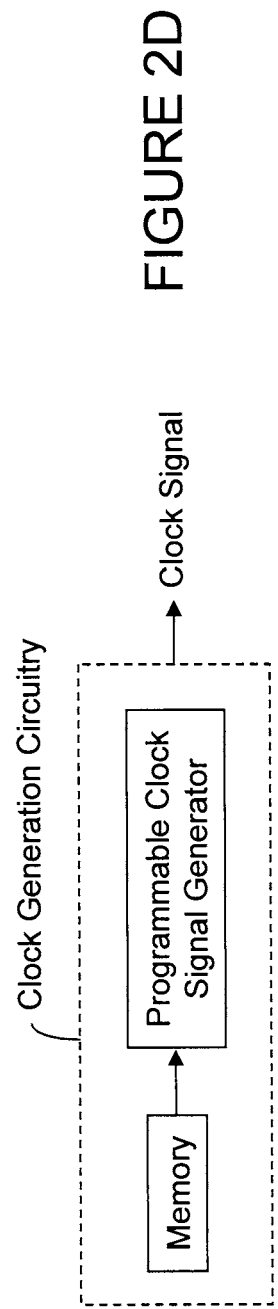

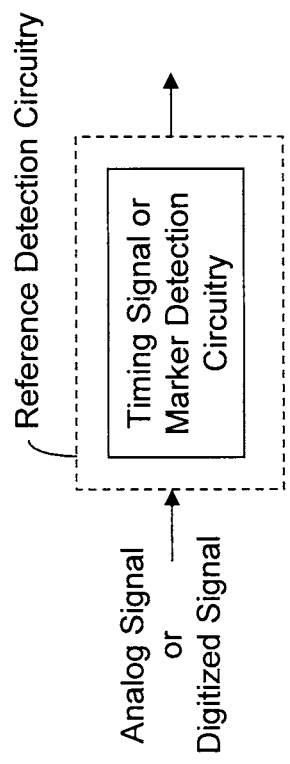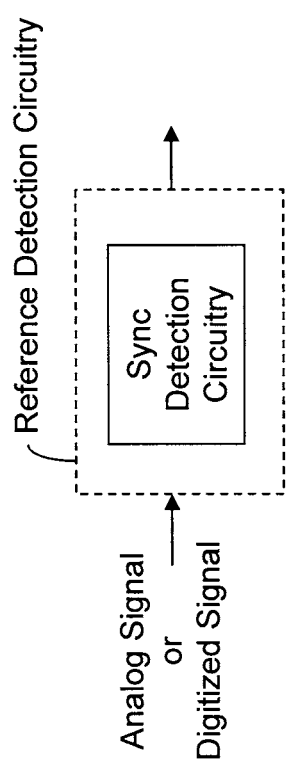

CIRCUITRY AND TECHNIQUES TO ASYNCHRONOUSLY PROCESS, OUTPUT AND/OR DISPLAY DIGITAL VIDEO DATA OF A BROADCAST

RELATED APPLICATION

This non-provisional application claims priority to U.S. Provisional Application Ser. No. 61/231,861, entitled "Circuitry and Techniques to Asynchronously Process, Output and/or Display Digital Video Data of a Video Broadcast", filed Aug. 6, 2009; the contents of the U.S. Provisional Application are incorporated by reference herein, in their entirety.

INTRODUCTION

In one aspect, the present inventions relate to circuitry to asynchronously or quasi-asynchronously process, output and/or display digital video data obtained, acquired, received and/or derived from a source synchronous video broadcast (for example, satellite, terrestrial and/or cable video transmission (for example, analog or digital TV broadcast). The present inventions also relate to methods of asynchronously or quasi-asynchronously processing, outputting and/or displaying such video data. Notably, a video broadcast is source synchronous when the broadcast includes information which is received, recovered and/or employed by the TV receiver to facilitate processing, outputting and/or displaying the video broadcast.

In another aspect, the present inventions also relate to circuitry that generates and outputs timing, clock and/or temporal reference signals which are employed to facilitate display of the video data of video broadcast or display video data wherein such timing, clock and/or temporal reference signals may vary in time or length, for example, from frame to frame. Such timing, clock and/or temporal reference signals may vary in time or length inversely with respect to a fixed frequency clock signal generated by, for example, local clock generation circuitry. The present inventions also relate to, among other things, methods of outputting such timing, clock or temporal reference signals and/or displaying video data using such signals.

Briefly, analog or digital TV broadcast generally includes video data and timing, clock or temporal reference information which facilitates processing, outputting and displaying of the video data of the broadcast. In this regard, the TV receiver generally consists of a TV tuner for (i) tuning the receiver to, for example, a user selected channel of the frequency band, and (ii) converting the received RF signal to a baseband signal. Within the baseband signal is video information and timing or clock information (for example, vertical and horizontal sync pulses in the context of an analog broadcast, and timing tags or markers in the context of certain digital broadcasts). In this regard, the video broadcast is source synchronous in that the broadcast includes timing, clock and/or reference information which is received, recovered and employed by the TV receiver to facilitate processing, outputting and/or displaying the video broadcast.

For example, processing circuitry in a TV receiver which complies with sampling and timing requirements of digital interface standards such as International Telecommunications Union (ITU) 601, typically derives a clock signal directly from the TV broadcast signal. This is often described as a "line locked clock" because synchronous timing recovery is performed by the TV receiver to maintain the sampling relationships required by the standards. Accordingly, such a video broadcast is source synchronous in that the broadcast includes information which is recovered and employed by the receiver to facilitate proper acquisition of the video data and subsequent display of the video broadcast. Indeed, the circuitry in the TV receiver employs the timing or clock information to process the received broadcast, as well as output and display the video broadcast.

Similarly, in digital video systems, a temporal reference signal is generally provided to restore and guarantee baseline timing, which in effect forces the receive clock to phase lock to the transmit clock. Here again, the video broadcast is source synchronous in that the digital broadcast includes information which is recovered and employed by the TV receiver to facilitate the display the video broadcast.

SUMMARY

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Importantly, the present inventions are neither limited to any single aspect nor embodiment, nor to any combinations and/or permutations of such aspects and/or embodiments. Moreover, each of the aspects of the present inventions, and/or embodiments thereof, may be employed alone or in combination with one or more of the other aspects and/or embodiments thereof. For the sake of brevity, certain permutations and combinations are not discussed and/or illustrated separately herein.

In a first principle aspect, certain of the present inventions are directed to circuitry and techniques of a method of processing a video signal of a source synchronous video broadcast which corresponds to a selected channel which is one of a plurality of channels of a broadcast spectrum, wherein the source synchronous video broadcast includes information which is representative of a frequency of a source clock. In this aspect of the inventions, the method comprises (i) generating digitized data of the video signal, which corresponds to the source synchronous video broadcast, using a local clock signal having a frequency which is different from the frequency of the source clock of the source synchronous video broadcast, (ii) generating video data using the digitized data of the video signal which corresponds to the source synchronous video broadcast, (iii) generating formatted video data blocks by arranging the video data into one or more lines or frames of video data; (iv) generating temporal reference signals wherein each temporal reference signal is associated with at least one formatted video data block; and (v) outputting each formatted video data block and associated temporal reference signal. Notably, the method may also include displaying the formatted video data blocks in accordance with the associated temporal reference signals.

In one embodiment, the temporal reference signals include at least one temporal reference signal which differs temporally in length relative to other temporal reference signals. Here, each formatted video data block includes a predetermined, fixed amount of data.

In another embodiment, the formatted video data blocks include one or more formatted video data blocks which varying in an amount of data relative to other formatted video data blocks. Here, the temporal reference signals include a predetermined, fixed temporal length.

In yet another embodiment, the formatted video data blocks include a predetermined, fixed amount of data and generating formatted video data blocks further includes generating the formatted video data blocks using information which correlates the local clock signal to the predetermined amount of data. Notably, the temporal reference signal associated with each formatted video data block may include a temporal length which changes in accordance with the frequency of the local clock signal.

The method may also include generating the local clock signal, wherein the local clock signal includes a fixed frequency during operation or a programmable frequency. Where the local clock includes a programmable frequency, the frequency of the local clock signal may be programmable at start-up or during an initialization sequence.

In one embodiment, generating the temporal reference signals further includes generating the temporal reference signals using the information which is representative of the source clock of the source synchronous video broadcast The temporal reference signals may include a predetermined, fixed temporal length. Here, generating formatted video data blocks may include arranging the video data into one or more lines or frames of video data having a predetermined, fixed amount of video data and wherein, if the amount of video data in a given formatted video data block is different from the predetermined amount, adding or discarding video data in the given formatted video data block so that the amount of video data into the given formatted video data block is equal to the predetermined amount.

The method may also includes detecting timing signals, markers or tags included in source synchronous video broadcast and, wherein generating the digitized data further includes generating the digitized data corresponding to each formatted video data block synchronously with respect to detecting associated timing signals, markers or tags. Here, generating formatted video data blocks further includes arranging the video data into one or more lines or frames of video data having a predetermined, fixed amount of video data and wherein, if the amount of video data in a given formatted video data block is different from the predetermined amount, adding or discarding video data into the given formatted video data block so that the amount of video data in the given formatted video data block is equal to the predetermined amount.

The method of this aspect of the inventions may also include detecting timing signals, markers or tags included in source synchronous video broadcast and, wherein generating the digitized data further includes initiating the generating digitized data corresponding to each formatted video data block synchronously with respect to detecting timing signals, markers or tags included in source synchronous video broadcast. Notably, generating formatted video data blocks may further include arranging the video data into one or more lines or frames of video data having a predetermined, fixed amount of video data. Indeed, each temporal reference signal may include a temporal length which depends on or changes in accordance with the frequency of the local clock signal.

In another principle aspect, the present inventions are directed to a video processing device to process a video signal of a source synchronous video broadcast which corresponds to a selected channel which is one of a plurality of channels of a broadcast spectrum, wherein the source synchronous video broadcast includes information which is representative of a frequency of a source clock. The video processing device of this aspect comprises tuner circuitry to convert the video signal of the source synchronous video broadcast of the selected channel to a baseband video signal, clock generation circuitry to generate a local clock signal, and processing circuitry, coupled to the tuner circuitry and the clock generation circuitry, to: (i) asynchronously, with respect to the source clock of the source synchronous video broadcast, digitize the baseband video signal using the local clock signal, wherein the local clock signal includes a frequency which is different from the frequency of the source clock, and (ii) generate video data using the digitized data which corresponds to the video signal of the source synchronous video broadcast of the selected channel. Output format circuitry, coupled to the processing circuitry, may generate formatted video data blocks by arranging the video data into one or more lines or frames.

In one embodiment, the output format circuitry further generates a plurality of temporal reference signals wherein each temporal reference signal is associated with at least one formatted video data block. Indeed, one or more of the temporal reference signals vary in length of time relative to other temporal reference signals of the plurality of temporal reference signals. Notably, the video processing device may include a video display, to receive the formatted video data blocks and display the formatted video data blocks in accordance with the associated temporal reference signals.

In another embodiment, the output format circuitry generates and outputs formatted video data blocks having a predetermined, fixed amount of data. Here, the output format circuitry may generate a plurality of temporal reference signals wherein each temporal reference signal (i) is associated with at least one formatted video data block and (ii) includes a varying temporal length which depends on the frequency of the local clock signal.

In yet another embodiment, the output format circuitry generates and outputs formatted video data blocks having a variable amount of data. In this embodiment, the output format circuitry further generates a plurality of temporal reference signals wherein each temporal reference signal (i) is associated with at least one formatted video data block and (ii) includes a predetermined, fixed temporal length.

The local clock signal, in one embodiment, includes a fixed frequency. For example, the clock generation circuitry may be hardwired to generate the local clock signal having the fixed frequency.

The local clock signal, in another embodiment, includes a programmable frequency. For example, the clock generation circuitry may be programmable at start-up or during an initialization sequence to generate the local clock signal having the programmable frequency.

The video processing device may also include detection circuitry to detect timing signals, markers or tags included in source synchronous video broadcast and, wherein the processing circuitry initiates digitizing of the baseband video signal corresponding to each formatted video data block synchronously with respect to the detection of associated timing signals, markers or tags included in source synchronous video broadcast.

In one embodiment, the output format circuitry: (i) generates the formatted video data blocks by arranging the video data into one or more lines or frames of video data having a predetermined and fixed amount of video data, and (ii) generates a plurality of temporal reference signals wherein each temporal reference signal is associated with at least one formatted video data block and the temporal reference signals include one or more temporal reference signals which temporally varying in length relative to other temporal reference signals.

Notably, circuitry of the video processing device may be portions of a monolithic integrated circuit device. For example, the tuner circuitry, processing circuitry and output format circuitry may be portions of a monolithic integrated circuit device.

In another principle aspect, the present inventions are directed to a machine readable storage medium having information stored thereon comprising data representing an expression of a video processing device to process a video signal of a source synchronous video broadcast which corresponds to a selected channel which is one of a plurality of channels of a broadcast spectrum, wherein the source synchronous video broadcast includes information which is representative of a frequency of a source clock. In this regard, the expression of the video processing circuitry comprises tuner circuitry to convert the video signal of the source synchronous video broadcast of the selected channel to a baseband video signal, clock generation circuitry to generate a local clock signal, and processing circuitry, coupled to the tuner circuitry and the clock generation circuitry, to: (i) asynchronously, with respect to the source clock of the source synchronous video broadcast, digitize the baseband video signal using the local clock signal, wherein the local clock signal includes a frequency which is different from the frequency of the source clock, and (ii) generate video data using the digitized data which corresponds to the video signal of the source synchronous video broadcast of the selected channel. The expression of the video processing circuitry further includes output format circuitry, coupled to the processing circuitry, to generate formatted video data blocks by arranging the video data into one or more lines or frames of video data.

In another principle aspect, the present inventions are directed to a method of testing a video processing device which processes a video signal of a source synchronous video broadcast which corresponds to a selected channel which is one of a plurality of channels of a broadcast spectrum, wherein the source synchronous video broadcast includes information which is representative of a frequency of a source clock. The method of testing a video processing device comprises:

generating digitized data of the video signal, which corresponds to the source synchronous video broadcast, using a local clock signal having a frequency which is different from the frequency of the source clock;

generating video data using the digitized data of the video signal, which corresponds to the source synchronous video broadcast;

generating formatted video data blocks by arranging the video data into one or more lines or frames of video data;

generating temporal reference signals wherein each temporal reference signal is associated with at least one formatted video data block; and outputting of each formatted video data block and associated temporal reference signal.

Notably, the method of testing may also include displaying of the formatted video data blocks in accordance with the associated temporal reference signals.

In yet another principle aspect, the present inventions are directed to a method of simulating on a computing system a video processing device which processes a video signal of a source synchronous video broadcast which corresponds to a selected channel which is one of a plurality of channels of a broadcast spectrum, wherein the source synchronous video broadcast includes information which is representative of a frequency of a source clock. The method comprises:

simulating the generation of digitized data of the video signal, which corresponds to the source synchronous video broadcast, using a local clock signal having a frequency which is different from the frequency of the source clock;

simulating the generation of video data using the digitized data of the video signal, which corresponds to the source synchronous video broadcast, simulating the generation of formatted video data blocks by arranging the video data into one or more lines or frames of video data;

simulating the generation of temporal reference signals wherein each temporal reference signal is associated with at least one formatted video data block; and simulating the output of each formatted video data block and associated temporal reference signal;

Here again, the method of simulating may further include simulating the display of the formatted video data blocks in accordance with the associated temporal reference signals.

As stated herein, there are many inventions, and aspects of the inventions, described and illustrated herein. This Summary is not exhaustive of the scope of the present inventions. Indeed, this Summary may not be reflective of or correlate to the inventions protected by the claims in this or continuation/divisional applications hereof.

Moreover, this Summary is not intended to be limiting of the inventions or the claims (whether the currently presented claims or claims of a divisional/continuation application) and should not be interpreted in that manner. While certain embodiments have been described and/or outlined in this Summary, it should be understood that the present inventions are not limited to such embodiments, description and/or outline, nor are the claims limited in such a manner (which should also not be interpreted as being limited by this Summary).

Indeed, many other aspects, inventions and embodiments, which may be different from and/or similar to, the aspects, inventions and embodiments presented in this Summary, will be apparent from the description, illustrations and claims, which follow. In addition, although various features, attributes and advantages have been described in this Summary and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed and/or illustrated separately herein.

FIGS. 2A-2E are schematic block diagram illustrations of exemplary clock generation circuitry embodiments, according to at least certain aspects of the present inventions; notably, such exemplary clock generation circuitry embodiments may be implemented in any of the embodiments described and/or illustrated herein (for example, FIG. 1A-1E);

FIGS. 6A and 6B are schematic block diagram illustrations of exemplary reference detection circuitry embodiments according to at least certain aspects of the present inventions, wherein such exemplary reference detection circuitry embodiments may be implemented in any of the embodiments described and/or illustrated herein (for example, FIG. 1A-1E);

Figure 1A:
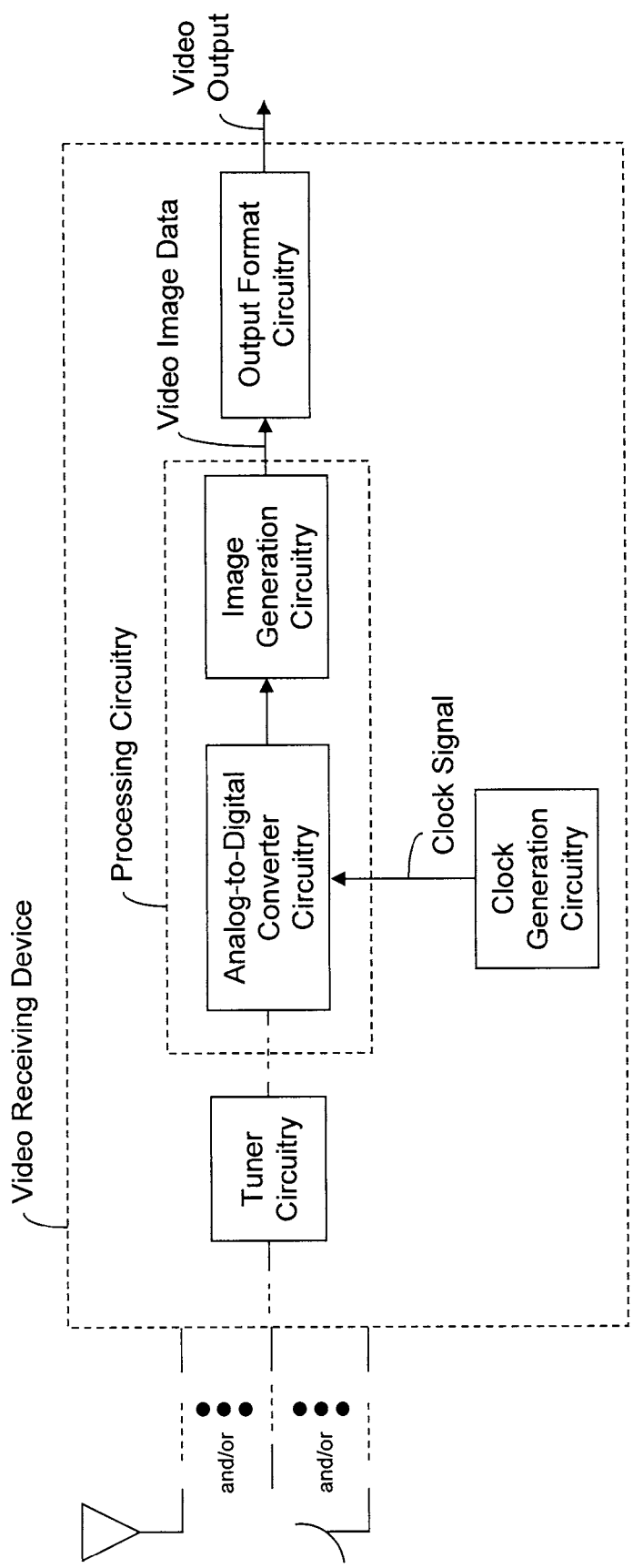
FIG. 1A is a schematic block diagram representation of exemplary video receiver circuitry, according to at least certain aspects of the present inventions.
Figure 1B:
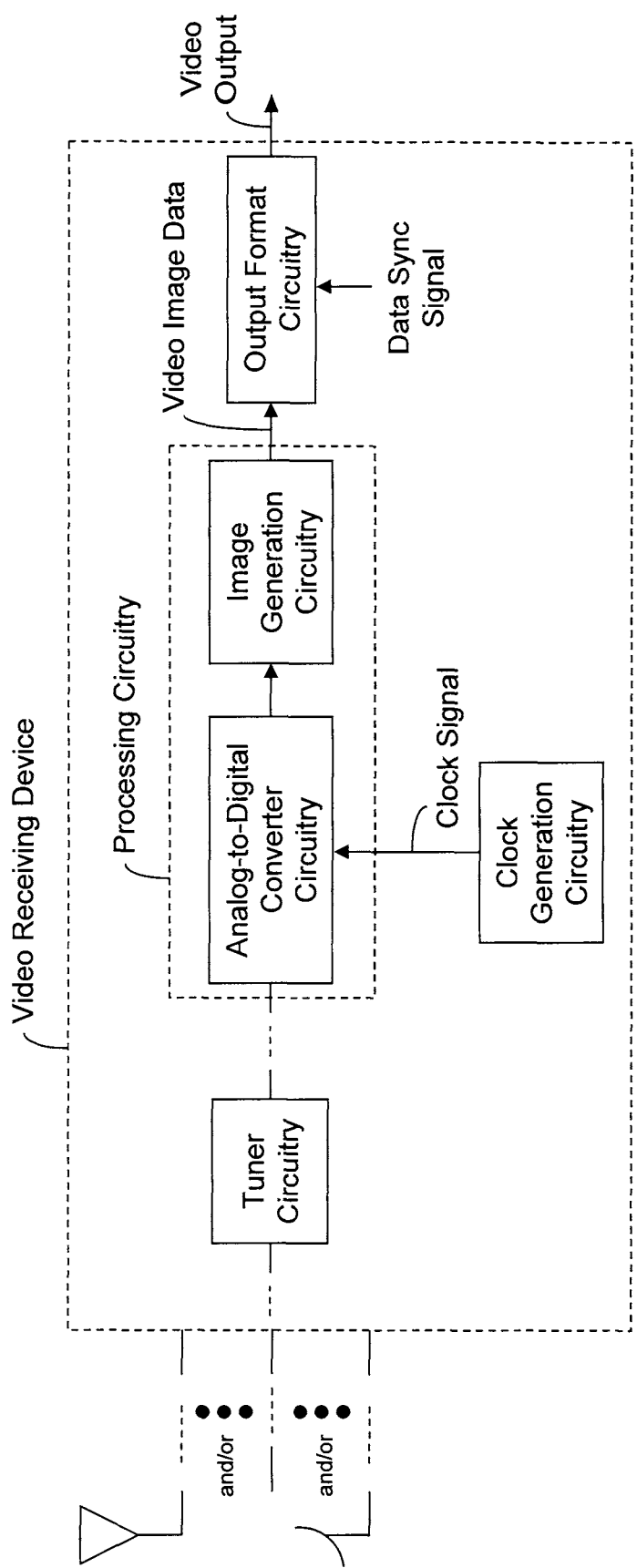
FIG. 1B is a schematic block diagram representation of exemplary video receiver circuitry, according to at least certain aspects of the present inventions, wherein data sync signal facilitates outputting and/or displaying of video data of a source synchronous video broadcast (for example, satellite, terrestrial and/or cable video transmission, in either analog or digital form.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

There are many inventions described and illustrated herein. In one aspect, the present inventions are directed to circuitry having an asynchronous or quasi-asynchronously (hereinafter collectively "asynchronously") digital video interface and/or to asynchronously process, output and/or display digital video data obtained, acquired, received and/or derived from a source synchronous video broadcast (for example, satellite, terrestrial and/or cable video transmission (for example, analog or digital TV broadcast)). The present inventions also relate to methods of asynchronously processing, outputting and/or displaying such video data. Notably, as mentioned above, a video broadcast is source synchronous in those instances where the broadcast includes data or signals that are representative of timing, clock or temporal reference information/signals which are employed by the video receiver (for example, TV receiver) to facilitate processing, outputting and/or displaying the video broadcast.

In another aspect, the present inventions relate to circuitry that generates and outputs timing, clock and/or temporal reference signals which are employed to facilitate display of the video data of video broadcast or display video data wherein the temporal characteristics of such timing, clock and/or temporal reference signals may temporally vary in length, for example, from line to line or frame to frame. In one embodiment, such timing, clock and/or temporal reference signals may vary in time or length, for example, in an inverse relationship to an operating frequency of a clock signal generated by, for example, "local" or "resident" clock generation circuitry. The present inventions also relate to, among other things, methods of outputting such timing, clock or temporal reference signals and/or displaying video data using such signals.

In one embodiment, processing circuitry according to at least one aspect of the present inventions employs a clock signal, having a fixed frequency during operation, to process a baseband video signal of a source synchronous video broadcast. For example, the processing circuitry may include an analog-to-digital converter to digitize a baseband incoming video signal using a local clock signal (generated, for example, locally) having a fixed frequency during operation. Under these circumstances, the processing circuitry samples the video signal asynchronously relative to the timing, clock or temporal reference signals of the source synchronous video broadcast. As such, the processing circuitry, in conjunction with clock generation circuitry, generates an asynchronous digitized representation of the baseband video signal (of the video broadcast).

The clock generation circuitry may be integrated or discrete circuitry of any kind or type, and may include one or more crystal oscillators, piezo-electric oscillators, RC circuits, microelectromechanical resonator/oscillator elements, and/or combinations thereof. All types and forms of clock generation circuitry, whether now known or later developed, are intended to fall within the scope of the present inventions.

In one embodiment, the clock generation circuitry is hard-wired (for example, a fixed clock signal generator) to generate or provide a clock signal having a predetermined fixed frequency. In another embodiment, the clock generation circuitry is one-time programmable (for example, programmed during test or at manufacture) or more than one-time programmable (for example, during test, start-up/power-up, during an initialization sequence and/or during operation (in situ)) to provide a clock signal having a predetermined fixed frequency during operation. In this regard, in one embodiment, the clock generation circuitry may include memory to store clock frequency information therein. For example, the clock generation circuitry may include fuses or anti-fuses, volatile or non-volatile memory, and/or DRAM, SRAM, ROM, PROM, EPROM, and/or EEPROM cells, to store data which is representative of the clock frequency information for use by the clock generation circuitry to generate the clock signal having a predetermined fixed frequency during operation.

For example, in one embodiment, the clock frequency information may be stored in one or more registers. In this embodiment, the clock frequency information may be provided to the clock generation circuitry, for example, at start-up/power-up, during an initialization sequence, and/or in response to one or more user or operator instructions or inputs. Indeed, in one embodiment, the clock frequency information is determined based on information which is representative of the geographic region and/or the video standard (for example, NTSC, PAL, SECAM or DVB-T) in which the device is operated) and thereafter such clock frequency information is provided to the clock generation circuitry. The information which is representative of the geographic region and/or the video standard may be determined at start-up/power-up, during an initialization sequence, and/or in response to user or operator instructions.

Notably, the memory (for example, register) may be a permanent, semi-permanent or temporary (i.e., until re-programmed) storage; for example, fuses or anti-fuses, volatile or non-volatile memory, and/or DRAM, SRAM, ROM, PROM, EPROM, and/or EEPROM cells that are resident on (i.e., integrated in) the interface circuitry, device or system, or external thereto (i.e., not integrated in). Indeed, the clock frequency information may be defined via a particular fixed configuration of the state of switch(es) or certain pin(s) on the package of the device (which may be, for example, defined or established during manufacturing). All circuitry and techniques of (i) determining the clock frequency information, (ii) storing clock frequency information and/or (iii) programming the clock generation circuitry to generate or provide a clock signal having a predetermined fixed frequency during operation are intended to fall within the scope of the present invention.

The digitized data (which is representative of the baseband video signal) may be further processed to generate video image data. Thereafter, output format circuitry may format the data and provide the video output to, for example, a display. In one embodiment, the output format circuitry formats and outputs the video data via a clock signal having a fixed frequency, which corresponds to the geographic region and/or the video standard (for example, NTSC, PAL, SECAM or DVB-T) in which the device is operated. For example, the output format circuitry, in one embodiment, formats the processed digitized data (which is representative of the baseband video signal) into one or more lines of data or frames of data (wherein each line of data or frame of data is a formatted video data block), each having an associated timing signal (for example, horizontal synchronization signals and vertical synchronization signals) and/or timing marker or tag (for example, start of active video data and end of active video data). Such timing signals and/or timing markers or tags may correspond to or correlate with the geographic region and/or the video standard (for example, NTSC, PAL, SECAM or DVB-T) in which the device is operated.

In another embodiment, output format circuitry formats and outputs the video data using timing signals and/or timing markers or tags that use and/or are derived from or representative of timing, clock or temporal reference information/signals of the source synchronous video broadcast. In this embodiment, the output format circuitry outputs video data, which is representative of the asynchronous digitized representation of the baseband video signal (of the video broadcast), using timing signals, markers or tags that are derived from or representative of timing, clock or temporal reference information/signals of the source synchronous video broadcast.

In yet another embodiment, the video data is formatted in accordance with the sampling rate of the analog-to-digital converter circuitry (as defined by the frequency of the clock generated by the clock generation circuitry). In this embodiment, output format circuitry formats the video data into a predetermined or fixed amount of data for each a data block (for example, a line of data or frame of data) to be provided to, for example, a video display. For example, in the context of the digital standard ITU-R BT.601, an active video line consists of 720 luminance samples and 360 chrominance samples per line; the color encoding system is generally known as YUV 4:2:2, that being the ratio of Y:Cb:Cr samples (luminance data:blue chroma data:red chroma data). As such, in one embodiment, for a pair of pixels, the data are stored in the order Y1:Cb:Y2:Cr, with the chrominance samples co-sited with the first luminance sample.

With that in mind, in one embodiment, the output format circuitry formats the video data in accordance with a data sync signal which correlates the sampling rate of the analog-to-digital converter circuitry to a predetermined or fixed amount of video data (which is representative of the asynchronously digitized baseband video signal). In this embodiment, the output format circuitry outputs (for example, to a display) the predetermined or fixed amount of video data regardless of the sampling rate of the analog-to-digital converter circuitry. As such, where the sampling rate of the analog-to-digital converter circuitry, as defined by the frequency of the clock generated by the clock generation circuitry, is greater than a nominal frequency (for example, the frequency of the timing, clock or temporal reference information/signals of the source synchronous broadcast), the analog-to-digital converter circuitry generates, provides and/or outputs (or may generate, provide and/or output) too many samples for a given data block (for example, a line of data or frame of data). That is, because the analog-to-digital converter circuitry samples are acquired asynchronously (relative to the timing, clock or temporal reference information/signals of the selected video broadcast), the analog-to-digital converter circuitry "undershoots" sampling of (or may "undershoot" sampling of) a data block (due to the local clock being higher in frequency than the timing, clock or temporal reference information/signals of the video broadcast). Here, the analog-to-digital converter circuitry acquires (or would acquire) the predetermined or fixed amount of video data of the data block (for example, a line of data or frame of data) before or prior to the "true" or actual end of the data block.

Where, however, the sampling rate of the analog-to-digital converter circuitry, as defined by the frequency of the clock generated by the clock generation circuitry, is less than a nominal frequency (for example, the frequency of the timing, clock or temporal reference information/signals of the source synchronous broadcast), the analog-to-digital converter circuitry generates, provides and/or outputs (or may generate, provide and/or output) too few samples for a given data block (for example, a line of data or frame of data). That is, the analog-to-digital converter circuitry "overshoots" sampling of (or may "overshoot" sampling of) a data block due to, for example, the local clock being lower in frequency than the timing, clock or temporal reference information/signals of the video broadcast. In this regard, the analog-to-digital converter circuitry does not (or would not) acquire the predetermined or fixed amount of video data of the data block (for example, a line of data or frame of data) until after or subsequent to the "true" or actual end of the data block. Indeed, the analog-to-digital converter circuitry may sample portions of the succeeding horizontal blanking interval or vertical blanking interval due to the local clock being of lower frequency relative to the timing, clock or temporal reference information/signals corresponding to the video broadcast.

Thus, in this embodiment, the video data is formatted via a data sync signal which correlates the sampling rate of the analog-to-digital converter circuitry, as defined by the frequency of the clock generated by the clock generation circuitry, to a predetermined or fixed amount of video data in a data block (for example, a line of data or frame of data) in the output format circuitry. That is, in this embodiment, a predetermined or fixed amount of video data, as digitized by the analog-to-digital converter circuitry, is output (for example, to a display) regardless of the sampling rate of the analog-to-digital converter circuitry. Here, the predetermined or fixed amount of video data is processed from the asynchronously acquired digitized representation of the baseband video signal.

Notably, where the analog-to-digital converter circuitry "overshoots" a video data block (due to the frequency of the local clock being lower than the timing, clock or temporal reference information/signals of the video broadcast), the data which represents the succeeding horizontal blanking interval or vertical blanking interval may be discarded or blanked thereby providing a border-like image. In addition thereto, or in lieu thereof, such data may be discarded and replaced by new data which is generated via, for example, interpolation of the actual video data. In this way, the circuitry generates or "regenerates" an effective "higher" number of data samples to provide/output, for example, the fixed and predetermined amount of data.

As such, circuitry (for example, the output format circuitry) may (a) replace, substitute and/or change the value of the data samples corresponding to the succeeding blanking interval with a predetermined or fixed value (for example, black) thereby providing a fixed color pixel corresponding to such data samples, and/or (b) interpolate data corresponding to the active video portion to generate video data which relates to the active video portion to thereby form a complete data block. For example, where the analog-to-digital converter circuitry generates 716 samples of real video data on a line and overshoots and acquires 4 samples in the horizontal blanking interval, the circuitry may substitute or replace the 4 data values (pixels values) by values that provide a predetermined or fixed color when displayed (for example, black). In addition thereto, or in lieu thereof, the circuitry may employ a plurality of the 716 samples of the active video and interpolate or re-interpolate the data to generate 4 additional data samples and thereby provide or "generate" 720 pixels from the 716 (for example, interpolate up to an effectively higher sampling rate). Under either example, the output format circuitry provides or outputs 720 "video" samples.

Notably, in addition to outputting the predetermined or fixed amount of video data of the data block, the output format circuitry may also output display synchronization or timing signals (for example, horizontal synchronization signals, vertical synchronization signals) and/or timing markers or tags (for example, start of active video data and end of active video data) to, for example, a video display. The temporal characteristics of the timing signals and/or timing markers or tags may be adjusted or vary in accordance with and/or in relation to the asynchronous sampling rate of the analog-to-digital converter circuitry. Thus, in this embodiment, the output format circuitry outputs the predetermined or fixed amount of video data of the data block as well as timing signals and/or timing markers or tags having temporal characteristics which may change or vary relative to, for example, one or more lines of the video output (for example, consecutive lines), one or more frames (for example, consecutive frames) of the video output, and/or from a nominal, predefined temporal characteristic—for example, as defined by standard or convention and/or the timing, clock or temporal reference information/signals of the selected video broadcast. In this embodiment, the temporal characteristics of the timing signals and/or timing markers or tags may vary in accordance with and/or in relation to the sampling rate of the asynchronously acquired digitized representation of the baseband video signal.

In another embodiment, the output format circuitry may output a variable amount of video data between the video data blocks (for example, a line of video data or frame of video data) and generate and output timing signals and/or timing markers or tags having a predefined temporal characteristic. In this embodiment, the number of asynchronous samples in the active video data block may vary between consecutive timing signals and/or timing markers or tags (for example, horizontal/vertical blanking signals) in the underlying video stream. The variation may be based on differences between the asynchronous sampling rate of the analog-to-digital converter circuitry and the time interval. That is, the analog-to-digital converter circuitry may "oversample" or "undersample" a video data block due to the frequency of the local clock being different from the timing, clock or temporal reference information/signals of the video broadcast. Thus, in this embodiment, a variable amount of video data, which is asynchronously acquired by the analog-to-digital converter circuitry, may be output (for example, to a display) between video data blocks (for example, a line of video data or frame of video data) whereas the output timing signals and/or timing markers or tags include a predefined temporal characteristic (for example, as defined by standard or convention and/or the particular timing, clock or temporal reference information/signals of the selected video broadcast).

In yet another embodiment, both the (i) temporal characteristics of the timing signals and/or timing markers or tags and (ii) amount of video data formatted and output for the video data blocks (for example, a line of video data or frame of video data) may be predetermined and fixed. In this embodiment, although the number of asynchronous samples in the active video data block may vary based on (1) the sampling rate of the analog-to-digital converter circuitry and (2) the time interval between consecutive timing signals and/or timing markers or tags (for example, horizontal/vertical blanking signals in the underlying video stream), the output format circuitry may adjust the amount of video data formatted and output for the video data blocks (for example, a line of video data or frame of video data) to a predetermined and fixed amount. In this embodiment, the output format circuitry may discard or add video data so that the video data blocks (for example, a line of video data or frame of video data) include the predetermined and fixed amount.

Thus, in this embodiment, where the analog-to-digital converter circuitry "oversamples" a video data block (due to the frequency of the local clock being higher than the timing, clock or temporal reference information/signals of the video broadcast), the output format circuitry may discard the additional samples and thereby provide or output video data blocks having the predetermined and fixed amount of data. Similar to those situations where the analog-to-digital converter circuitry "overshoots" the active data, where, the analog-to-digital converter circuitry "undersamples" a video data block (due to the frequency of the local clock being lower than the timing, clock or temporal reference information/signals of the video broadcast), the output format circuitry may add data (for example, data which when displayed provides a border) to provide or output video data blocks having the predetermined and fixed amount of data. In addition thereto, or in lieu thereof, additional samples may be generated via, for example, interpolation in order to generate or "regenerate" an effective "higher" number of samples to provide the fixed and predetermined number of samples. Again, in this embodiment both the (i) temporal characteristics of the timing signals and/or timing markers or tags and (ii) amount of video data formatted and output for the video data blocks (for example, a line of video data or frame of video data) are predetermined and fixed during operation.

Notably, the output format circuitry may output the video output data and display synchronization or timing signals, timing markers or tags in a multiplexed configuration (for example, multiplexed on one or more signal or data lines). Alternatively, the output format circuitry may output the display synchronization or timing signals, timing markers or tags on separate (for example, dedicated) signal or data lines.

In certain embodiments, the present inventions include circuitry to generate the data sync signal. As mentioned above, the data sync signal, in certain embodiments, correlates the sampling rate of the analog-to-digital converter circuitry to a predetermined or fixed amount of data in a data block (for example, a line of data or frame of data). With that in mind, in one embodiment, such circuitry generates the data sync signal using (i) the sampling rate of the analog-to-digital converter circuitry, as defined by the frequency of the clock generated by the clock generation circuitry, and (ii) timing, clock or temporal reference information/signals of the video broadcast (for example, horizontal synchronization and/or vertical synchronization signals) and/or timing markers or tags (for example, start of active video data and end of active video data) which, for example, may correspond to or correlate with the geographic region and/or the video standard (for example, NTSC, PAL, SECAM or DVB-T).

For example, where the circuitry generates the data sync signal using horizontal synchronization or blanking signals, the output format circuitry may format, synchronize and/or lock the asynchronously acquired or derived video data based on a beginning of each line of video of a video display (and, as such, in this example, the data block is a line of video data). Indeed, it may be advantageous to employ the horizontal synchronization or blanking signals of the video broadcast to correlate, synchronize and/or lock the formatting of the data block where the underlying received video is an analog transmission standard such as, for example, NTSC, PAL, SECAM, or the like. Notably, the "start" of the asynchronous sampling by the analog-to-digital converter circuitry may also be correlated, synchronized and/or locked to horizontal synchronization or blanking signals of the selected video broadcast. That is, where the circuitry generates the data sync signal using horizontal synchronization or blanking signals, the "starting point" for the asynchronous sampling may be the beginning of each line of video of a video display. Thus, as each line is output, the received horizontal synchronization or blanking timing (of the selected video broadcast) may be compared against the local horizontal synchronization or blanking timing. In certain embodiments, as discussed above, the horizontal blanking interval generated and output by the output format circuitry may temporally vary in length to accommodate for the differential between the frequency of the sampling clock (from the clock generation circuitry) and a nominal frequency (for example, the frequency of the timing, clock or temporal reference information/signals of the source synchronous broadcast).

Under those circumstances where the circuitry generates the data sync signal using vertical synchronization or blanking of the video broadcast, the output format circuitry formats, synchronizes and/or locks the asynchronous acquired or derived video data based on the beginning of each frame of video of a video display (and, as such, in this example, the data block is a frame of video data). Similarly, the "start" of the asynchronous sampling by the analog-to-digital converter circuitry may also be correlated, synchronized and/or locked to vertical synchronization or blanking signals of the video broadcast. That is, where the circuitry generates the data sync signal using vertical synchronization or blanking signals, the "starting point" for the asynchronous sampling may be the beginning of each frame of video. Thus, as each frame is output, the received vertical blanking timing may be compared against the local vertical blanking timing. Indeed, as discussed above, in certain embodiments, the vertical blanking interval generated and output by the output format circuitry may temporally vary in length to accommodate for the differential between the frequency of the sampling clock (from the clock generation circuitry) and a nominal frequency (for example, the frequency of the timing, clock or temporal reference information/signals of the source synchronous broadcast).

Notably, it may be advantageous to employ the vertical synchronization or blanking signals of the video broadcast to correlate, synchronize and/or lock the formatting of the data block (here, a frame of video data) and/or "start" of asynchronous sampling where the underlying received video is a digital standard such as, for example, ATSC, DVB-T or the like.

In another embodiment, the synchronization circuitry generates the data sync signal using timing markers such as the start and/or end of the video in the underlying analog video signal. In this embodiment, a variable horizontal blanking interval or vertical blanking interval may occur between digital words corresponding to end-of-active-video (EAV) and start-of-active-video (SAV) for the next video scan line or next video frame, respectively. Such an embodiment may be suitable for transmissions corresponding to ITU-R BT.601 (where the predetermined or fixed number of samples per active video line is 720) or the like.

With reference to FIG. 1A, in one exemplary embodiment, the present inventions are directed to a video receiving device having tuner circuitry, processing circuitry, clock generation circuitry and output format circuitry. Briefly, the tuner circuitry, in one exemplary embodiment, responsively tunes the video receiving circuitry to, for example, one or more user selected channels of a frequency band, converts a received RF signal to a baseband video signal and outputs a baseband video signal to the processing circuitry. The tuner circuitry (which may include channel decoder circuitry) may, among other things, responsively acquire one or more channels (for example, one or more channels which are associated with one or more of the user selected channels).

Notably, the present inventions may be implemented in conjunction with any type of tuner circuitry (including discrete devices or integrated devices), whether now known or later developed. All such tuner circuitry, consistent with communications outlined herein, are intended to fall within the scope of the present inventions.

With continued reference to FIG. 1A, the processing circuitry, in one exemplary embodiment, asynchronously digitizes the baseband video signal and converts the digitized data stream to video image data. In this regard, analog-to-digital converter circuitry, in conjunction with a clock signal generated by clock generation circuitry, asynchronously digitizes the baseband video signal and provides the digitized data stream to image generation circuitry. The image generation circuitry further processes the digitized data by converting the digitized data, which is representative of the baseband video signal, to video image data.

As noted above, the clock generation circuitry generates and outputs a clock signal, having a predetermined fixed frequency during operation, which is employed by the analog-to-digital converter circuitry to asynchronously digitize or sample the baseband video signal. The clock generation circuitry may be integrated or discrete circuitry of any kind or type, and may include one or more crystal oscillators, piezoelectric oscillators, RC circuits, microelectromechanical (MEMS) resonator/oscillator elements, and/or combinations thereof. All types and forms of clock generation circuitry, whether now known or later developed, are intended to fall within the scope of the present inventions.

Figure 2A:
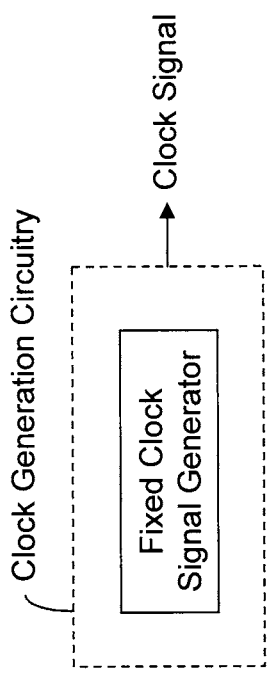
Figure 2B:
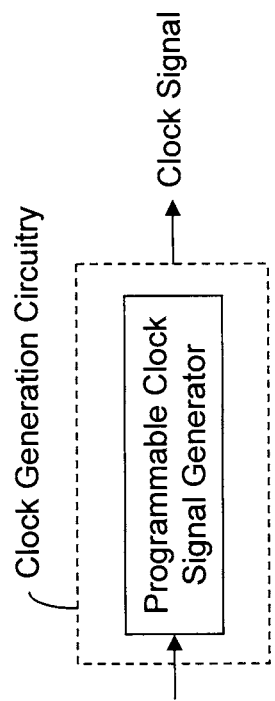

In one embodiment, the clock generation circuitry is hardwired (for example, a fixed clock signal generator) to generate or provide a clock signal having a predetermined fixed frequency. (See, FIG. 2A). In another embodiment, the clock generation circuitry is one-time programmable (for example, programmed during test or at manufacture) or more than one-time programmable (for example, during start-up/power-up, an initialization sequence and/or operation (in situ)) to provide a clock signal having a predetermined fixed frequency during operation. (See, for example, FIG. 2B). In another exemplary embodiment, the clock frequency information may be provided to the clock generation circuitry, for example, at start-up/power-up, during an initialization sequence and/or in response to user or operator instructions. (See, for example, FIG. 2C). Indeed, in one exemplary embodiment, external broadcast circuitry may provide the clock frequency information at start-up/power-up, during an initialization sequence, and/or in response to a query by the video receiving device of, for example, the geographic region and/or the video standard (for example, NTSC, PAL, SECAM or DVB-T) in which the device is or is to be operated.

Figure 2E:
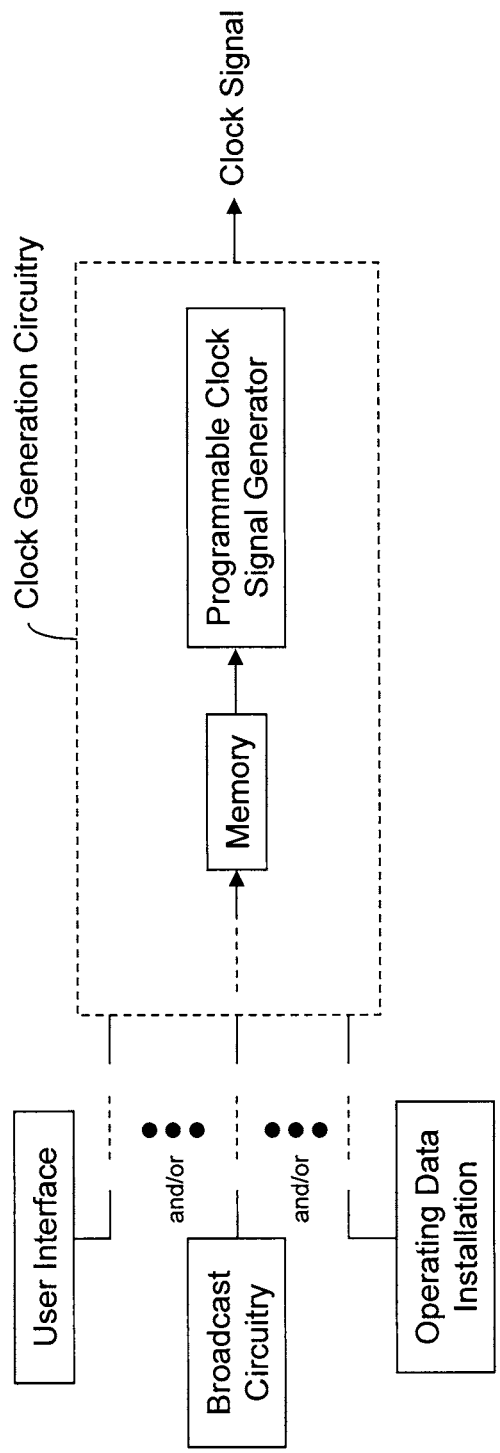

In one embodiment, the clock generation circuitry may include memory to store clock frequency information therein. (See, for example, FIG. 2D). For example, the clock generation circuitry may include fuses or anti-fuses, volatile or non-volatile memory, and/or DRAM, SRAM, ROM, PROM, EPROM, and/or EEPROM cells, to store data which is representative of the clock frequency information for use by circuitry to generate the clock signal having the predetermined frequency. Indeed, the clock frequency information may be stored in one or more registers or the like. In this exemplary embodiment, the clock frequency information may be provided to the clock generation circuitry, for example, at start-up/power-up, during an initialization sequence and/or in response to user or operator instructions. In one exemplary embodiment, the user or operator may provide information which is representative of the geographic region (or the like, for example, a video standard such as NTSC, PAL, SECAM or DVB-T) in which the video receiving device is or is to be operated, and in response thereto, the memory may provide the corresponding clock frequency information to the programmable clock signal generator. (See, for example, FIG. 2E). The clock generation circuitry, during operation, generates a clock signal having a predetermined fixed frequency based on such information.

The information which is representative of the geographic region (or the like, for example, a video standard such as NTSC, PAL, SECAM or DVB-T) may be provided to the clock generation circuitry, for example, at start-up/power-up, during an initialization sequence, by external broadcast circuitry and/or, as mentioned above, in response to user or operator instructions. (See, for example, FIG. 2E). For example, in one exemplary embodiment, external broadcast circuitry may provide the information to the clock generation circuitry during an initialization sequence of, for example, the geographic region and/or the video standard (for example, NTSC, PAL, SECAM or DVB-T) in which the device is or is to be operated. In response thereto, memory in the clock generation circuitry may provide the corresponding clock frequency information to the programmable clock signal generator. (See, for example, FIG. 2E).

Notably, the memory (for example, one or more registers) to store data which is representative of the clock frequency information may be a permanent, semi-permanent or temporary (i.e., until re-programmed) storage; for example, fuses or anti-fuses, volatile or non-volatile memory, and/or DRAM, SRAM, ROM, PROM, EPROM, and/or EEPROM cells that are resident on (i.e., integrated in) the device or system or external thereto (i.e., not integrated in). All circuitry and techniques of (i) storing clock frequency information and/or (ii) programming the clock generation circuitry to generate or provide a clock signal having a predetermined fixed frequency are intended to fall within the scope of the present invention.

Figure 3A:
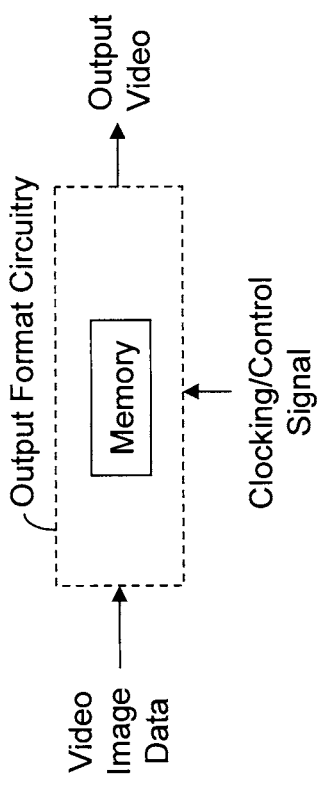
FIGS. 3A-3F are schematic block diagram illustrations of exemplary output format circuitry embodiments, according to at least certain aspects of the present inventions, wherein such exemplary output format circuitry embodiments may be implemented in any of the embodiments described and/or illustrated herein (for example, FIG. 1A-1E)

With continued reference to FIG. 1A, the output format circuitry receives the video image data and formats the data for output to, for example, a display. In one embodiment, the output format circuitry includes memory to store and format the video data and, in response to one or more clocking/control signals, output the video data to, for example, a video display. (See, FIG. 3A). In one embodiment, the output format circuitry formats and outputs the video data via a clocking or control signal, which, during operation, includes a fixed frequency. The clocking or control signal, in one embodiment, corresponds or correlates the output of video data to the geographic region and/or the video standard (for example, NTSC, PAL, SECAM or DVB-T) in which the device is operated. For example, the output format circuitry, in one embodiment, formats the processed digitized data (which is representative of the asynchronously digitized baseband video signal) into video data blocks (for example, a line of video data or frame of video data) and, in response to the clocking or control signal outputs video data blocks to, for example, a display, in accordance with, for example, the standard in which the video receiving device is operated.

Figure 3B:
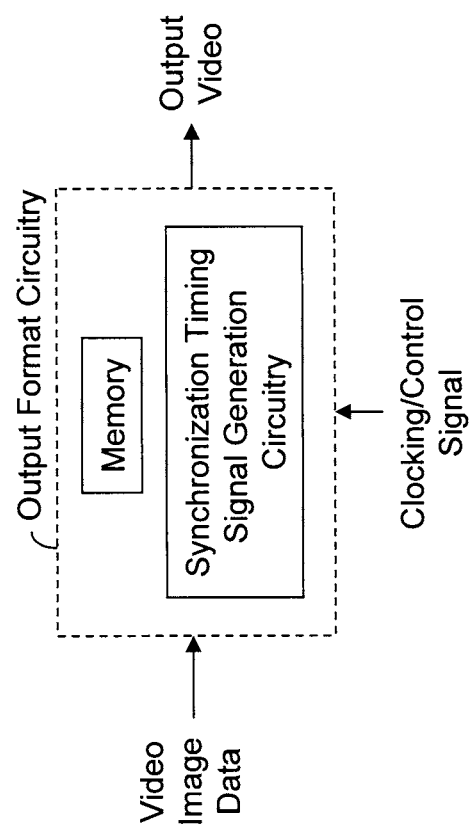
Figure 3C:
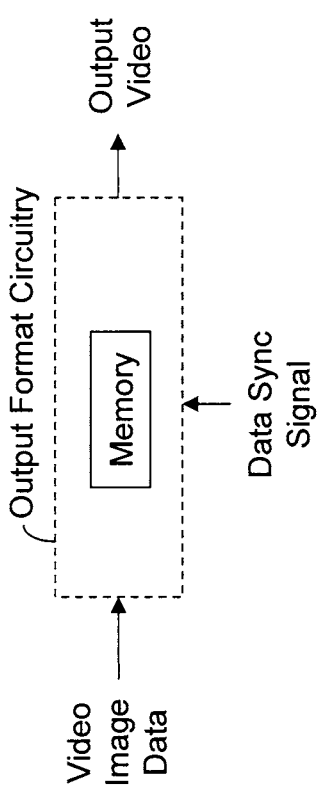
Figure 3D:
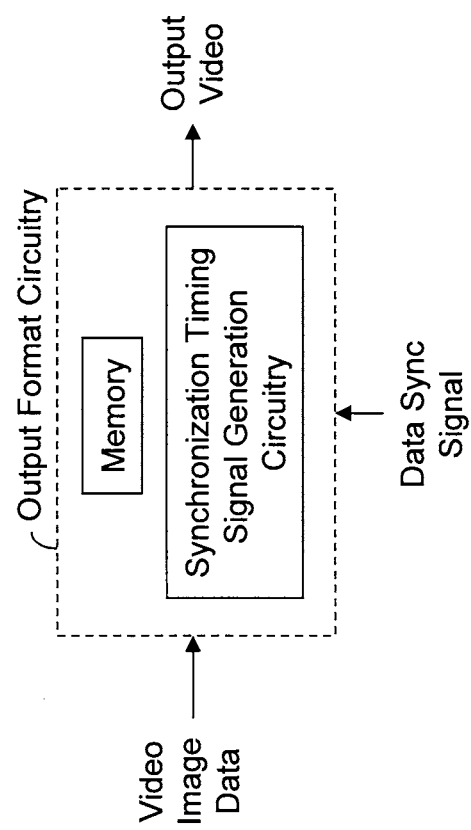
Figure 4:
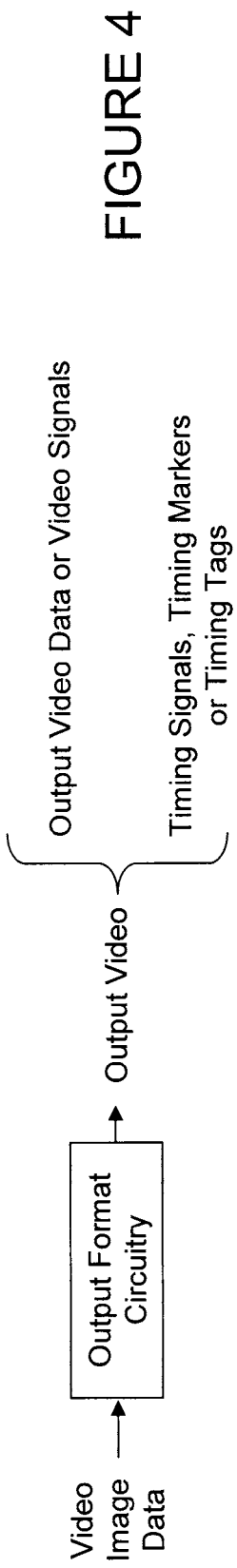
FIG. 4 is an illustration of output format circuitry and exemplary output video provided thereby, including the components of such output video (which in the illustrative embodiment are (i) output video data or output video signals and (ii) display timing signals, timing markers or timing tags), according to at least certain aspects of the present inventions.

The output format circuitry may also generate and output timing signals (for example, horizontal synchronization signals and vertical synchronization signals) and/or timing markers or tags (for example, start of active video data and end of active video data) to, for example, facilitate display of the video images on a display. (See, for example, FIGS. 3B and 4). In one embodiment, such timing signals and/or timing markers or tags may correspond to or correlate with the geographic region and/or the video standard (for example, NTSC, PAL, SECAM or DVB-T) in which the device is operated. Indeed, in this embodiment, such timing signals may be derived from or representative of timing, clock or temporal reference information/signals of the source synchronous video broadcast.

Figure 5A:
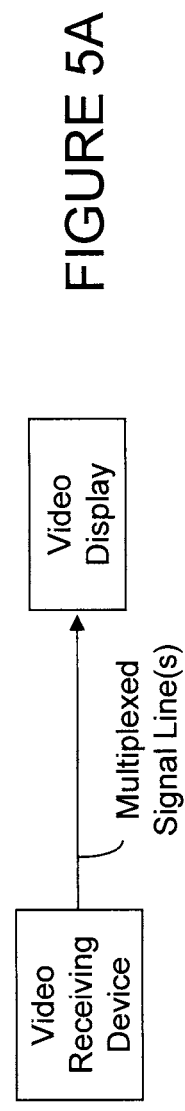
FIGS. 5A and 5B illustrate schematic block diagrams of exemplary video receiving device, according certain aspects of the present inventions, wherein such device provides display timing signals, timing markers or timing tags and the output video data on one or more multiplexed signal line(s) (FIG. 5A), or such device provides the display timing signals, timing markers or timing tags on one or more separate line(s) from the one or more line(s) that provide the output video data (FIG. 5B)
Figure 5B:
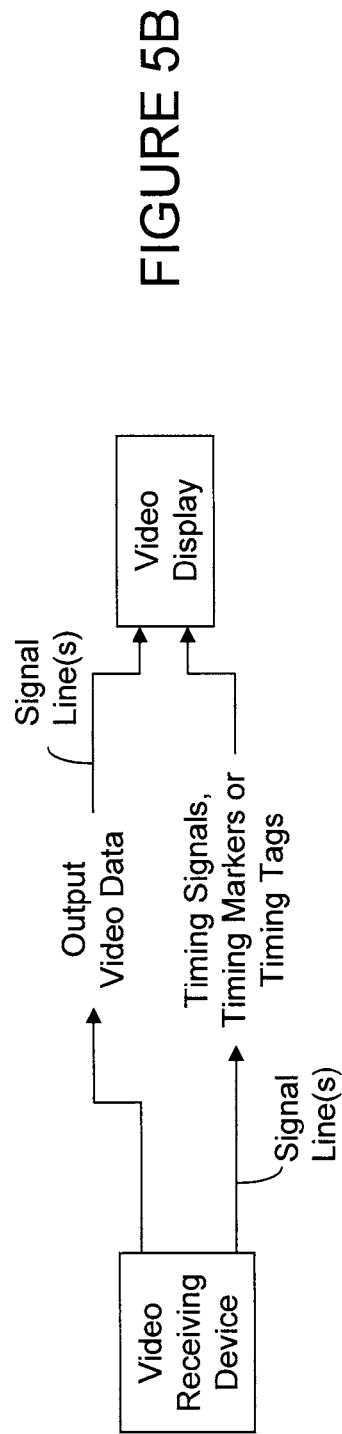
Figure 7A:
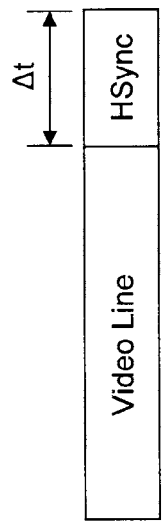
FIGS. 7A-7G are block diagram illustrations of exemplary output video, including the components of such output video, according to at least certain aspects of the present inventions, wherein the temporal characteristics of one or more of the display timing signals, timing markers or timing tags therein vary as described herein; notably, "$\Delta t$" indicates that the length of time of the corresponding display timing signals, timing markers or timing tags may vary.
Figure 7B:
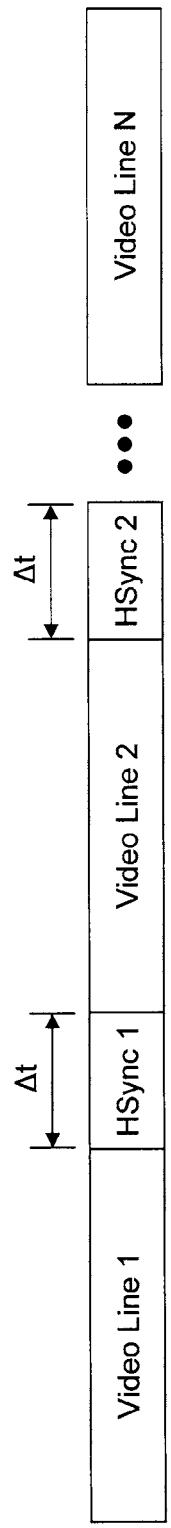
Figure 7C:
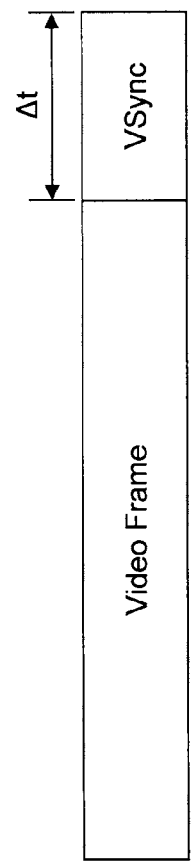
Figure 7D:
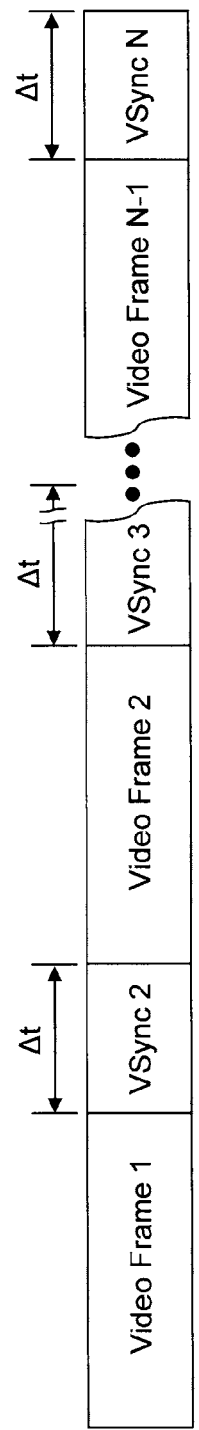
Figure 7E:
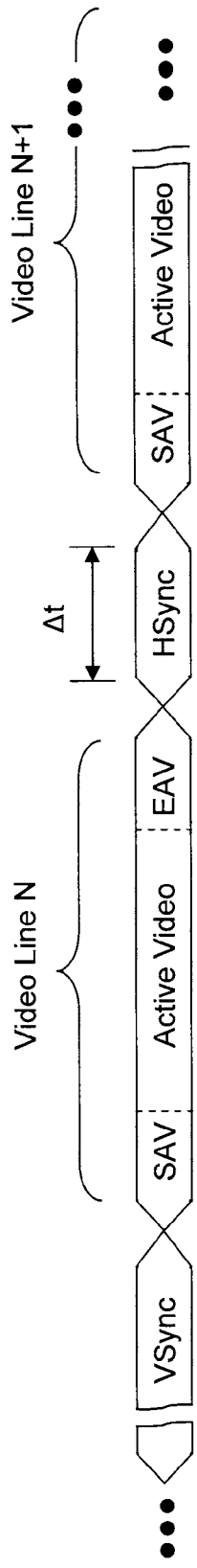
Figure 7F:
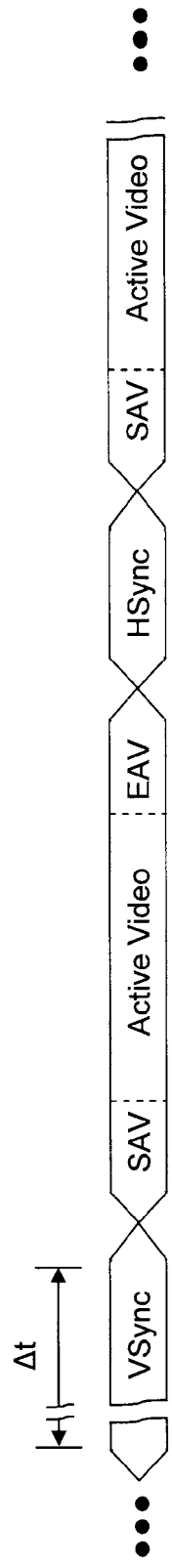
Figure 7G:
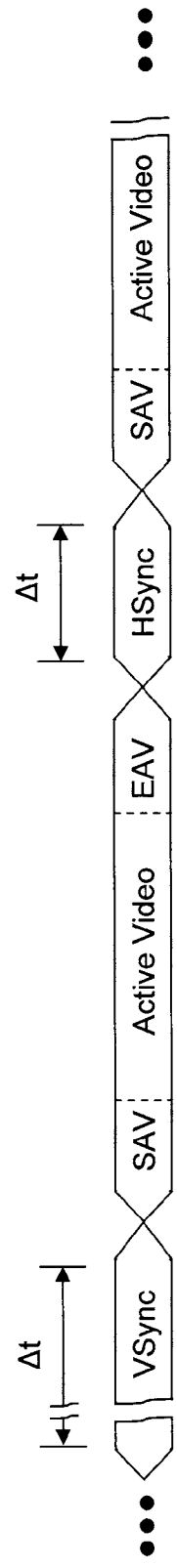
Figure 8A:
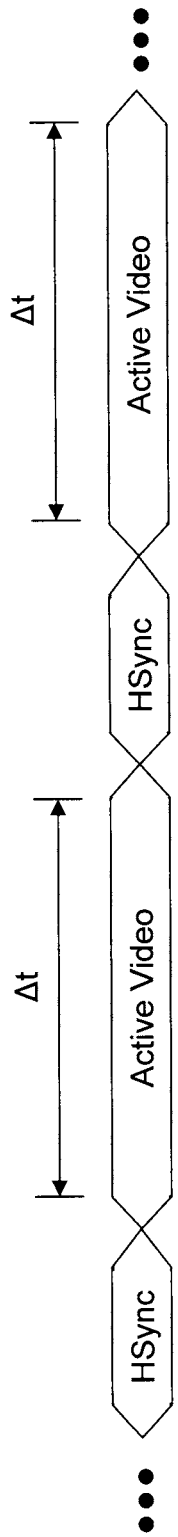
FIGS. 8A and 8B are block diagram illustrations of exemplary output video, including the components of such output video, according to at least certain aspects of the present inventions, wherein the temporal characteristics of one or more of the video data block (for example, line of video data or frame of video data) vary as described herein and, in certain embodiments, the display timing signals, timing markers or timing tags therein having predetermined or fixed temporal characteristics; notably, "$\Delta t$" indicates that the length of time and/or the number of samples of the active video or video output (for the corresponding line or frame) may vary.
Figure 8B:
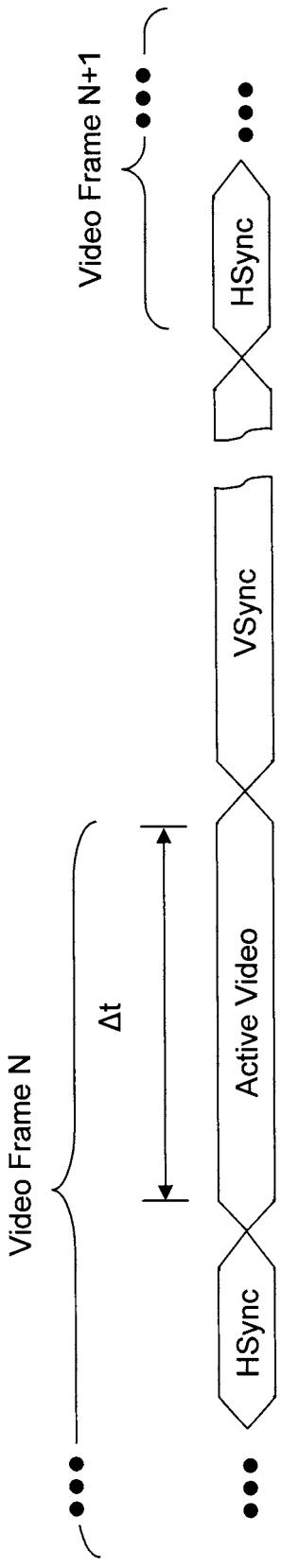
Figure 9A:
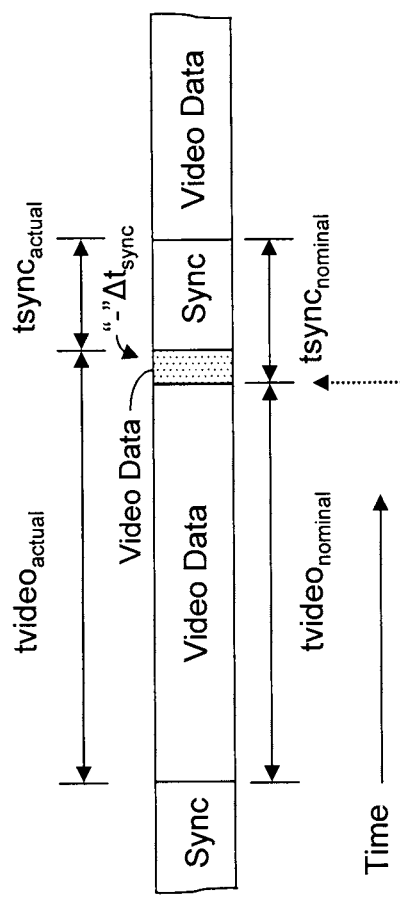
FIGS. 9A and 9B are block diagram illustrations of exemplary output video, including display timing signals and digital output video data, according to at least certain aspects of the present inventions, wherein in certain embodiments (i) the frequency of the clock signal generated by the local clock generation circuitry is lower than, for example, the frequency of a nominal clock signal (which is, for example, temporally related to or synchronized with the frequency of the source clock provided with the source synchronous broadcast) and, as such, a predetermined number of digitized samples of the baseband video signal are acquired in a greater amount of time than nominally necessary and the temporal characteristic of the display synchronization timing signal is less than the corresponding temporal characteristic of a nominal display synchronization timing signal (FIG. 9A), wherein the difference thereof is illustrated as "$-$"$\Delta t_{sync}$, and (ii) the frequency of the clock signal generated by the local clock generation circuitry is higher than, for example, the frequency of a nominal clock signal and, as such, a predetermined number of digitized samples of the baseband video signal are acquired in a less amount of time than nominally necessary and the temporal characteristic of the display synchronization timing signal is greater than the corresponding temporal characteristic of a nominal display synchronization timing signal (FIG. 9B), wherein the difference thereof is illustrated as "$+$"$\Delta t_{sync}$.
Figure 9B:
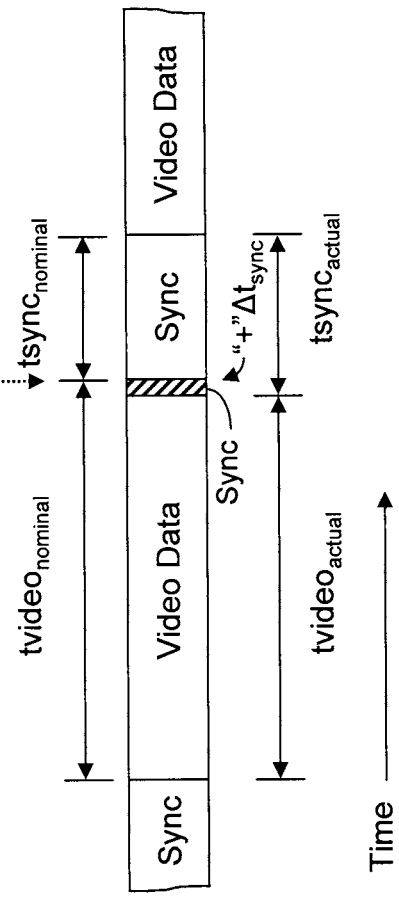
Figure 10A:
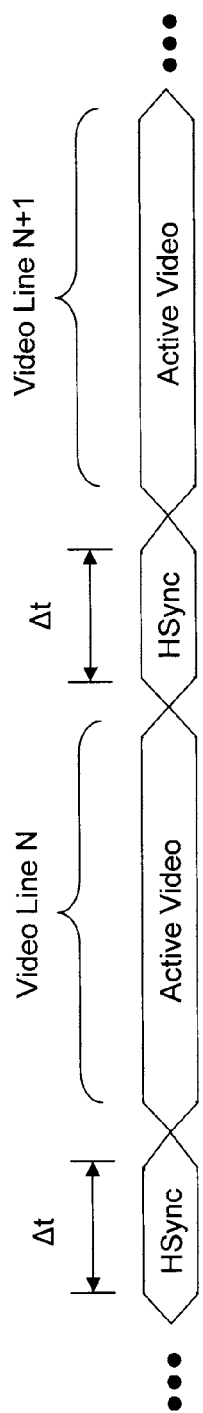
FIGS. 10A-10C are block diagram illustrations of exemplary output video, including the components of such output video, according to at least certain aspects of the present inventions, wherein, one or more of the display timing signals, timing markers or timing tags therein vary as described herein; notably, "$\Delta t$" indicates that the length of time of the corresponding display timing signals, timing markers or timing tags may vary.
Figure 10B:
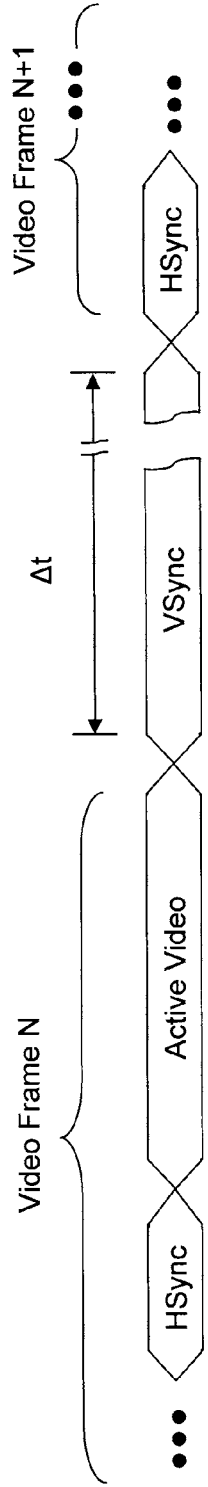
Figure 10C:
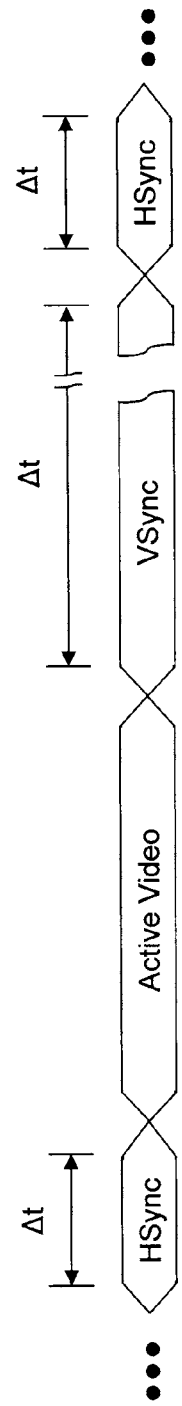

The output format circuitry may be configured to output the video output data and display synchronization or timing signals (for example, horizontal synchronization signals, vertical synchronization signals, start of active video data and end of active video data), timing markers or tags in a multiplexed manner (for example, multiplexed on one or more signal or data lines). (See, FIG. 5A). Alternatively, the output format circuitry may output the display synchronization or timing signals, timing markers or tags on separate (for example, dedicated) signal or data lines. (See, FIG. 5B). These output techniques may be employed in any of the embodiments described and/or illustrated herein. For the sake of brevity, such techniques will not be separately illustrated but are generally illustrated herein as in FIGS. 3A-3D.

In another set of embodiments, the video data and/or the timing signals, markers or tags are formatted and/or correlated in accordance with the sampling rate of the analog-to-digital converter circuitry (as defined by the frequency of the clock generated by the clock generation circuitry). (See, for example, FIGS. 1B and 3C-3E). In these embodiments, the output format circuitry formats and/or correlates the video image data (data which is representative of the asynchronously digitized baseband video signal) to output (i) a predetermined or fixed amount of video data in a data block (for example, a line of data or frame of data) and timing signals, markers or tags having variable temporal characteristics, or (ii) a variable amount of video data in the data block and timing signals, markers or tags having predetermined or fixed temporal characteristics.

With reference to FIGS. 1B and 3C-3F, the output format circuitry may format the video image data in accordance with a data sync signal which correlates the asynchronous sampling rate of the analog-to-digital converter circuitry to a predetermined or fixed amount of output video data. In this embodiment, the output format circuitry outputs (for example, to a display) the predetermined or fixed amount of video data regardless of the sampling rate of the analog-to-digital converter circuitry. As such, where the sampling rate of the analog-to-digital converter circuitry, as defined by the frequency of the clock generated by the clock generation circuitry, is greater than a nominal frequency (for example, the frequency of the timing, clock or temporal reference information/signals of the video broadcast), too many samples may be acquired by the analog-to-digital converter circuitry for a given data block (for example, a line of data or frame of data). Here, the analog-to-digital converter circuitry samples are acquired asynchronously (relative to the timing, clock or temporal reference information/signals of the selected video broadcast), and, as such, the analog-to-digital converter circuitry "undershoots" sampling of (or may "undershoot" sampling of) a data block (due to the frequency of the local clock being higher than the frequency of the timing, clock or temporal reference information/signals of the video broadcast). In this regard, the analog-to-digital converter circuitry acquires (or would acquire) the predetermined or fixed amount of video data of the data block (for example, a line of data or frame of data) before or prior to the "true", actual or nominal end of the data block.

Where, however, the sampling rate of the analog-to-digital converter circuitry is less than a nominal frequency (for example, the frequency of the timing, clock or temporal reference information/signals of the source synchronous broadcast), too few samples are acquired for a given data block (for example, a line of data or frame of data). That is, the analog-to-digital converter circuitry "overshoots" sampling of (or may "overshoot" sampling of) a data block due to, for example, the frequency of the local clock being lower than the timing, clock or temporal reference information/signals of the video broadcast. In this regard, the analog-to-digital converter circuitry does not (or would not) acquire the predetermined or fixed amount of video data of the data block (for example, a line of data or frame of data) until after or subsequent to the "true", actual or nominal end of the data block. Indeed, the analog-to-digital converter circuitry may sample portions of the succeeding horizontal blanking interval or vertical blanking interval due to the local clock being of lower frequency relative to the frequency of the timing, clock or temporal reference information/signals corresponding to the video broadcast.

Figure 3E:
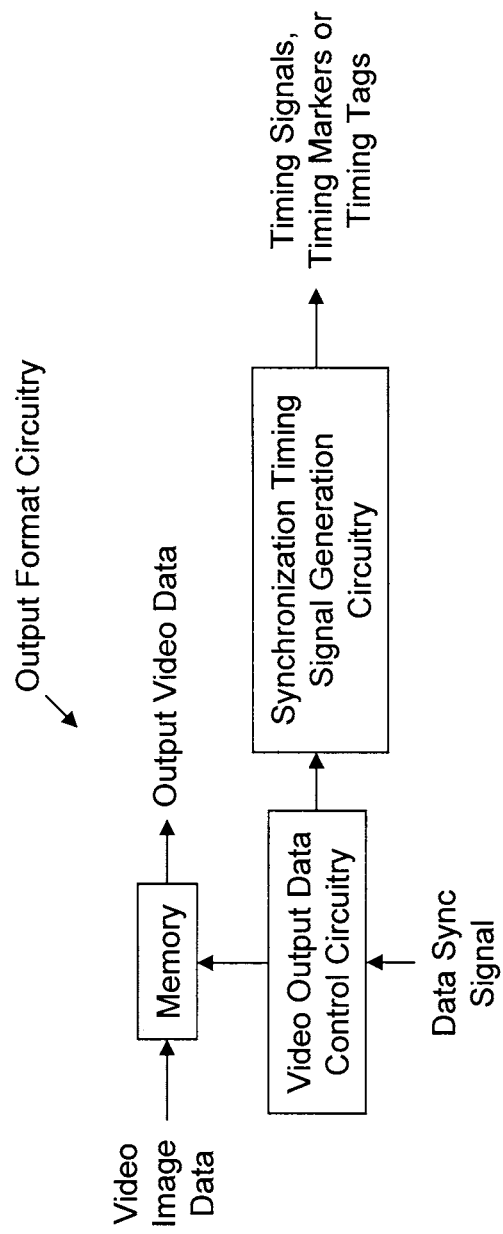

Accordingly, in this embodiment, the video data is correlated to the asynchronous sampling rate of the analog-to-digital converter circuitry, as defined by the frequency of the clock generated by the clock generation circuitry, and the output format circuitry provides and/or outputs a predetermined or fixed amount of video data in a data block (for example, a line of data or frame of data). With reference to FIG. 3E, in this embodiment, the video output data control circuitry configures the data block to a predetermined or fixed amount of video data, which was asynchronously digitized by the analog-to-digital converter circuitry, and controls the output of the format circuitry to provide such predetermined or fixed amount of video data regardless of the sampling rate of the analog-to-digital converter circuitry.

Notably, as discussed in detail below, the video output data control circuitry may control and/or vary the temporal characteristics of the timing signals and/or timing markers or tags and, in this embodiment, control and/or vary the temporal characteristics of the timing signals and/or timing markers or tags in accordance with and/or in relation to the asynchronous sampling rate of the analog-to-digital converter circuitry.

Figure 1C:
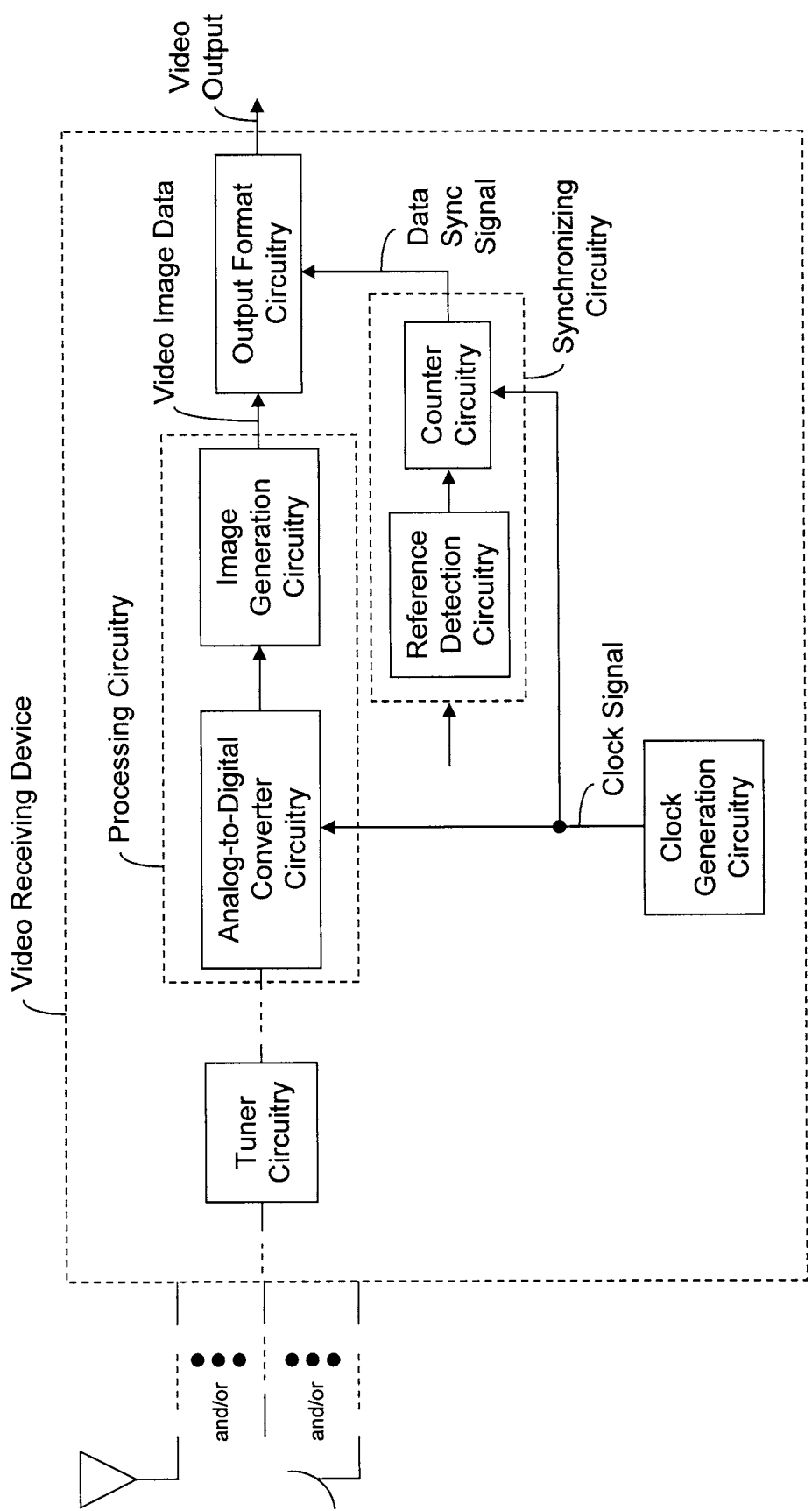
FIGS. 1C-1E are schematic block diagram representations of exemplary video receiver circuitry, according to at least certain aspects of the present inventions, wherein the video receiver device includes exemplary synchronizing circuitry embodiments which generate data sync signals which facilitates formatting, outputting and/or displaying of video data of a video broadcast and generating and outputting display timing signals, timing markers or timing tags employed to display such data.

The video receiving device may include synchronization circuitry to generate a data sync signal that, in one exemplary embodiment, is correlated to the asynchronous analog-to-digital conversion of the baseband signal of the selected video broadcast. With reference to FIG. 1C, in one exemplary embodiment, the synchronization circuitry includes reference detection circuitry and counter circuitry to generate the data sync signal. In this exemplary embodiment, the counter circuitry is coupled to the clock signal to increment or decrement in response to a transition of the clock signal. As noted above, the clock signal controls when the analog-to-digital converter circuitry samples the baseband signal of the selected video broadcast. As such, in this exemplary embodiment, the frequency of the sampling or digitizing by the analog-to-digital converter circuitry is correlated to the rate of counting by the counter circuitry; and the count value is representative of a number of digitized samples of the baseband signal of the selected video broadcast.

For example, in one embodiment, in operation, when the counter circuitry counts to a predetermined value, for example, 720 samples in the context of the digital standard ITU-R BT.601, the counter circuitry responsively provides a signal to and/or instructs the output format circuitry. The output format circuitry, in response, may format the video image data into an appropriate data block (for example, a line of data) and, thereafter, output the data to, for example, a display. Thus, in this exemplary embodiment, the data sync signal provides the output format circuitry with information which is representative of a number of digitized samples of the baseband signal of the selected video broadcast.

As indicated above, in certain embodiments, the temporal characteristics of the timing signals and/or timing markers or tags may be adjusted or vary in accordance with and/or in relation to the asynchronous sampling rate of the analog-to-digital converter circuitry. Thus, in this embodiment, the timing signals and/or timing markers or tags may include temporal characteristics which may change or vary relative to, for example, one or more lines of the video output (for example, consecutive lines), one or more frames (for example, consecutive frames) of the video output, and/or from a nominal, predefined temporal characteristic—for example, as defined by standard or convention and/or the timing, clock or temporal reference information/signals of the selected video broadcast. (See, for example, FIGS. 7A-7G). In one embodiment, video output data control circuitry (see FIGS. 3E and 3F) may adjust and/or control the temporal characteristics of the timing signals and/or timing markers or tags and, in this embodiment, adjust and/or control the temporal characteristics of the timing signals and/or timing markers or tags in accordance with and/or in relation to the asynchronous sampling rate of the analog-to-digital converter circuitry.

Notably, the counter circuitry may be initiated, started, reset and/or controlled in accordance with a signal which is representative of the timing, clock or temporal reference information/signals of the selected video broadcast. For example, with reference to FIGS. 1C and 6A, in one exemplary embodiment, the reference detection circuitry includes circuitry to detect or determine the timing, clock or temporal reference information/signals/markers of the selected video broadcast. The timing signal or marker detection circuitry may be sync detection circuitry (see FIG. 6B), for example, circuitry that detects, determines or identifies horizontal synchronization and/or vertical synchronization signals of the selected video broadcast.

Thus, where the synchronization circuitry generates the data sync signal using horizontal synchronization or blanking signals (detected by, for example, sync detection circuitry), the output format circuitry may format, synchronize and/or lock the asynchronously acquired or derived video data based on a beginning of each line of video of a video display (and, as such, in this example, the data block is a line of video data). As noted above, it may be advantageous to employ the horizontal synchronization or blanking signals of the video broadcast to correlate, synchronize and/or lock the formatting of the data block where the underlying received video is an analog transmission standard such as, for example, NTSC, PAL, SECAM, or the like.

The "start" of the asynchronous sampling by the analog-to-digital converter circuitry may also be correlated, synchronized and/or locked to horizontal synchronization or blanking signals of the selected video broadcast. That is, where the synchronization circuitry generates the data sync signal using horizontal synchronization or blanking signals, the "starting point" for the asynchronous sampling may be the beginning of each line of video of a video display. Thus, as each line is output, the received horizontal synchronization or blanking timing (of the selected video broadcast) may be compared against the local horizontal synchronization or blanking timing. In certain embodiments, as discussed herein, the horizontal blanking interval generated and output by the output format circuitry may temporally vary in length to address or accommodate for the differential between the frequency of the sampling clock (from the clock generation circuitry) and a nominal frequency (for example, the frequency of the timing, clock or temporal reference information/signals of the broadcast). (See, for example, FIGS. 7A, 7B, 8A and 8B).

Under those circumstances where the reference detection circuitry detects, determines and/or identifies vertical synchronization or blanking of the video broadcast, the output format circuitry formats, synchronizes and/or locks the asynchronous acquired or derived video data based on the beginning of each frame of video of a video display (and, as such, in this example, the data block is a frame of video data). In addition, the "start" of the asynchronous sampling by the analog-to-digital converter circuitry may also be correlated, synchronized and/or locked to vertical synchronization or blanking signals of the video broadcast. That is, where the synchronization circuitry generates the data sync signal using vertical synchronization or blanking signals, the "starting point" for the asynchronous sampling may be the beginning of each frame of video.

Thus, as each frame is output, the received vertical blanking timing may be compared against the local vertical blanking timing. Indeed, as discussed herein, in certain embodiments, the vertical blanking interval generated and output by the output format circuitry may temporally vary in length to accommodate for the differential between the frequency of the sampling clock (from the clock generation circuitry) and a nominal frequency (for example, the frequency of the timing, clock or temporal reference information/signals of the source synchronous broadcast). (See, for example, FIGS. 7C, 7D, 8A and 8B)

As mentioned above, it may be advantageous to employ the vertical synchronization or blanking signals of the video broadcast to correlate, synchronize and/or lock the formatting of the data block (here, a frame of video data) and/or "start" of asynchronous sampling where the underlying received video is a digital standard such as, for example, ATSC, DVB-T or the like.

With continued reference to FIGS. 1C and 6A, the timing signal or marker detection circuitry may detect, determine and/or identify timing markers such as the start and/or end of the video in the underlying analog video signal. As such, in this exemplary embodiment, the count value is representative of a number of digitized samples of the baseband signal of the selected video broadcast correlated to the timing markers of such video broadcast. Moreover, the counter circuitry may be initiated, started, reset and/or controlled in accordance with a signal which is representative of the timing markers of the selected video broadcast. In this embodiment, a variable horizontal blanking interval or vertical blanking interval may occur between digital words corresponding to end-of-active-video (EAV) and start-of-active-video (SAV) for the next video scan line. Such an embodiment may be suitable for transmissions corresponding to ITU-R BT.601 (where the predetermined or fixed number of samples per active video line is 720) or the like. (See, for example, FIGS. 7E-7G).

The reference detection circuitry may be configured to detect, determine and/or identify timing, clock or temporal reference information/signals of the selected video broadcast using an analog or digitized signal. (See, FIGS. 6A and 6B). In one embodiment, the reference detection circuitry may sense the analog version of the broadcast, for example, the baseband signal of the selected broadcast, for example, at the input of the analog-to-digital converter circuitry. In another embodiment, the reference detection circuitry may sense the digitized representation of the baseband signal of the selected broadcast, for example, at the output of the analog-to-digital converter circuitry.

Notably, all circuitry and techniques for detecting, determining and/or identifying timing, clock or temporal reference information/signals of the selected video broadcast (for example, the horizontal synchronization or blanking signals, vertical synchronization or blanking signals and/or start and/or end of the video in the video signal), whether now known or later developed, are intended to fall within the scope of the present inventions.

Figure 1D:
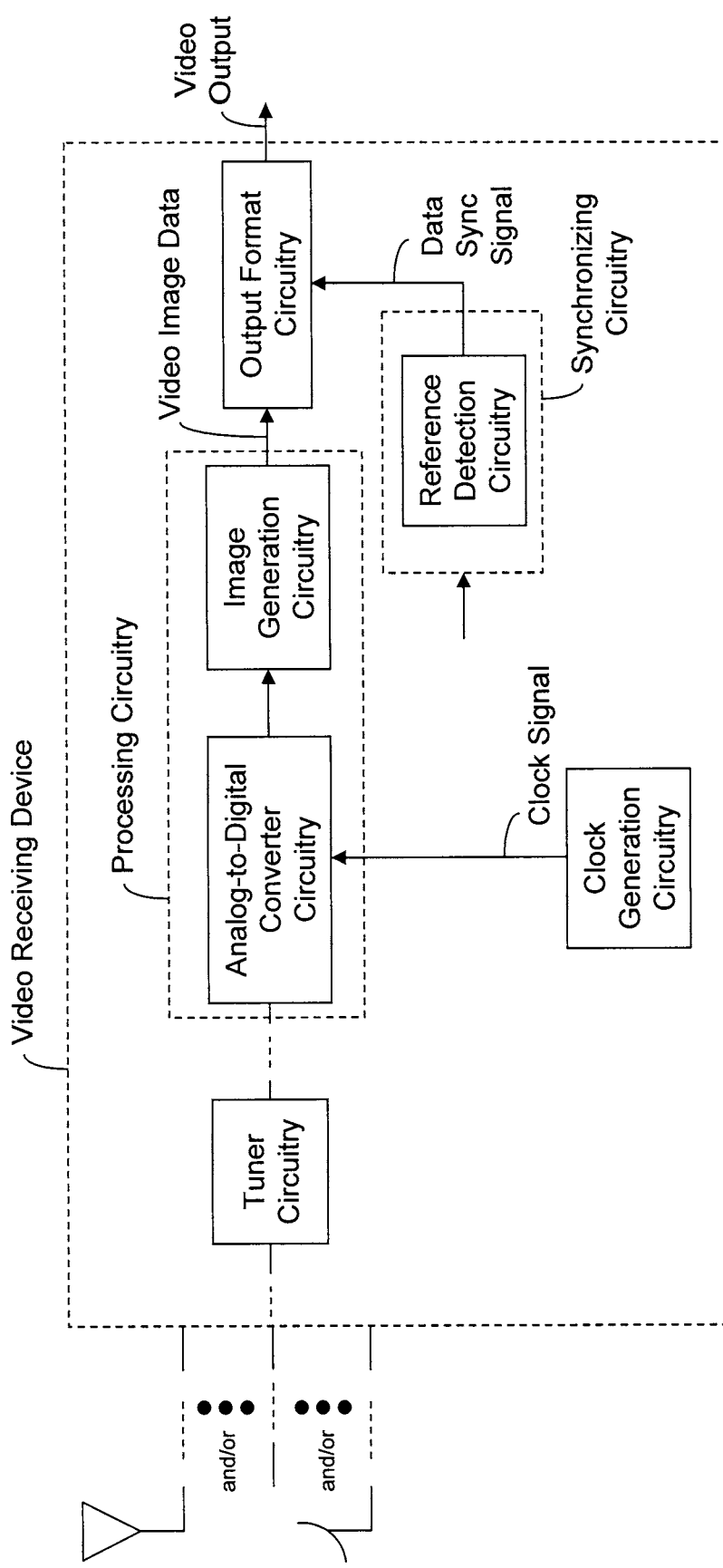
Figure 3F:
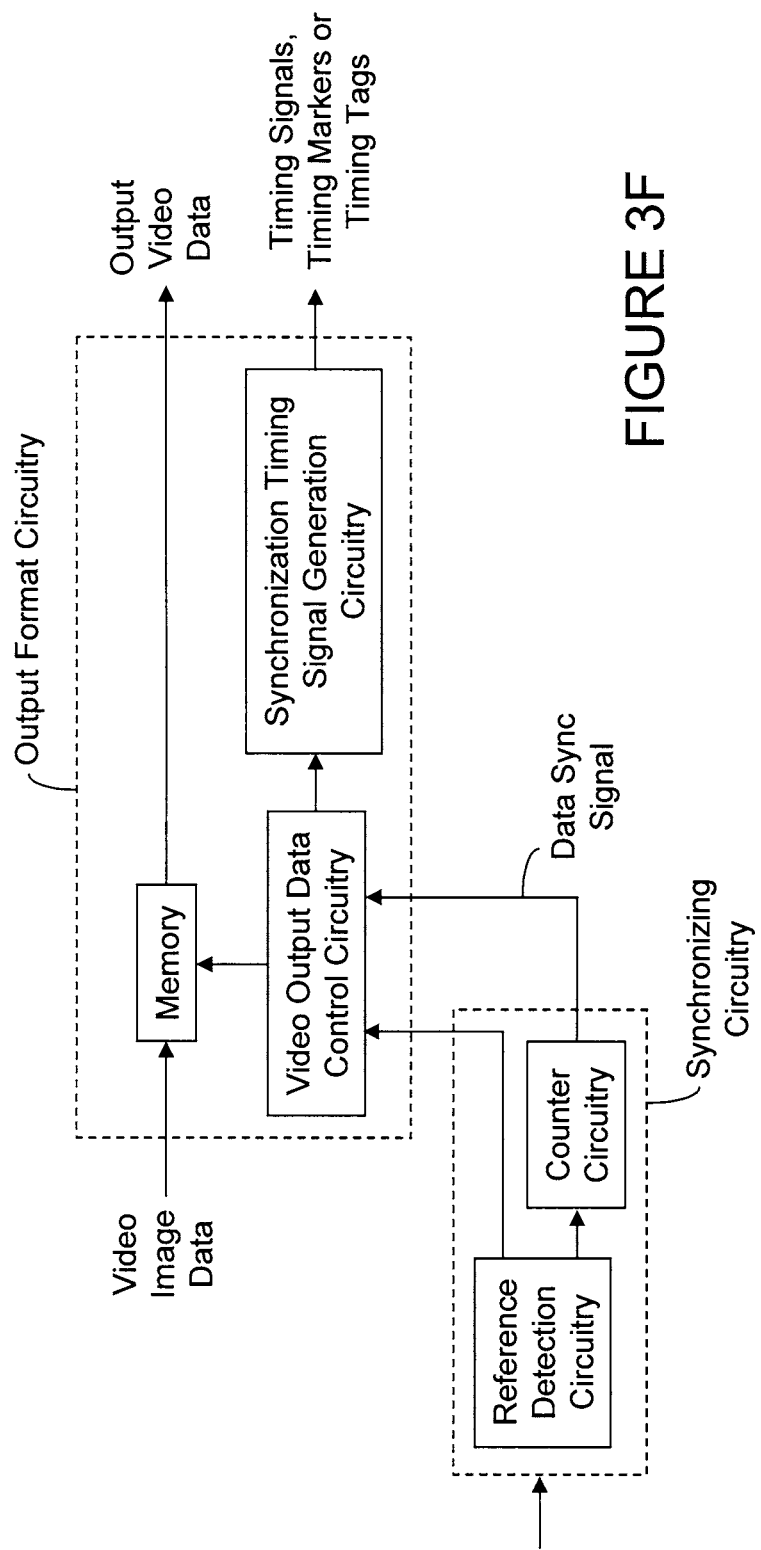

With reference to FIGS. 1D, 3E and 3F, in another embodiment, the output format circuitry outputs a variable amount of video data between the video data blocks (for example, a line of video data or frame of video data) and generates and outputs timing signals and/or timing markers or tags having a predefined or predetermined temporal characteristic. In this embodiment, the number of asynchronous samples of the baseband video signal in the active video data block may vary between consecutive timing signals and/or timing markers or tags (for example, horizontal/vertical blanking signals in the underlying video stream). Here, the reference detection circuitry may detect, determine and/or identify timing, clock or temporal reference information/signals of the selected video broadcast using an analog or digitized signal. (See, FIGS. 6A and 6B). The video output data control circuitry (see FIGS. 3E and 3F) may adjust and/or control the number of asynchronous samples of the baseband video signal in the active video data block.

The variation of the number of asynchronous samples of the baseband video signal in the active video data block may be based on the difference between the asynchronous sampling rate of the analog-to-digital converter circuitry and the time interval of the timing, clock or temporal reference information/signals. That is, the analog-to-digital converter circuitry may "oversample" or "undersample" a video data block due to the variation of the frequency of the local clock relative to the timing, clock or temporal reference information/signals of the video broadcast. Thus, in this embodiment, the output timing signals and/or timing markers or tags may include a more predefined, predetermined temporal characteristic (for example, as defined by standard or convention and/or the particular timing, clock or temporal reference information/signals of the selected video broadcast) whereas the video receiving device may output a variable amount of video data which is asynchronously digitized by the analog-to-digital converter circuitry.

Notably, with reference to FIGS. 1D and 3E, in one embodiment, the output timing signals and/or timing markers or tags may be derived from or based on the timing signals and/or timing markers or tags in the selected video broadcast (for example, horizontal/vertical blanking signals). In this embodiment, the reference detection circuitry may detect, determine and/or identify timing, clock or temporal reference information/signals of the selected video broadcast. In response thereto, the reference detection circuitry generates a data sync signal that "controls" the formatting and outputting of the video data blocks.

As indicated above, the reference detection circuitry may sense the analog version of the broadcast, for example, the baseband signal of the selected broadcast, for example, at the input of the analog-to-digital converter circuitry. (See, FIG. 6A). In addition thereto or in lieu thereof, the reference detection circuitry may sense the digitized representation of the baseband signal of the selected broadcast, for example, at the output of the analog-to-digital converter circuitry. (See, FIG. 6B).

Figure 1E:
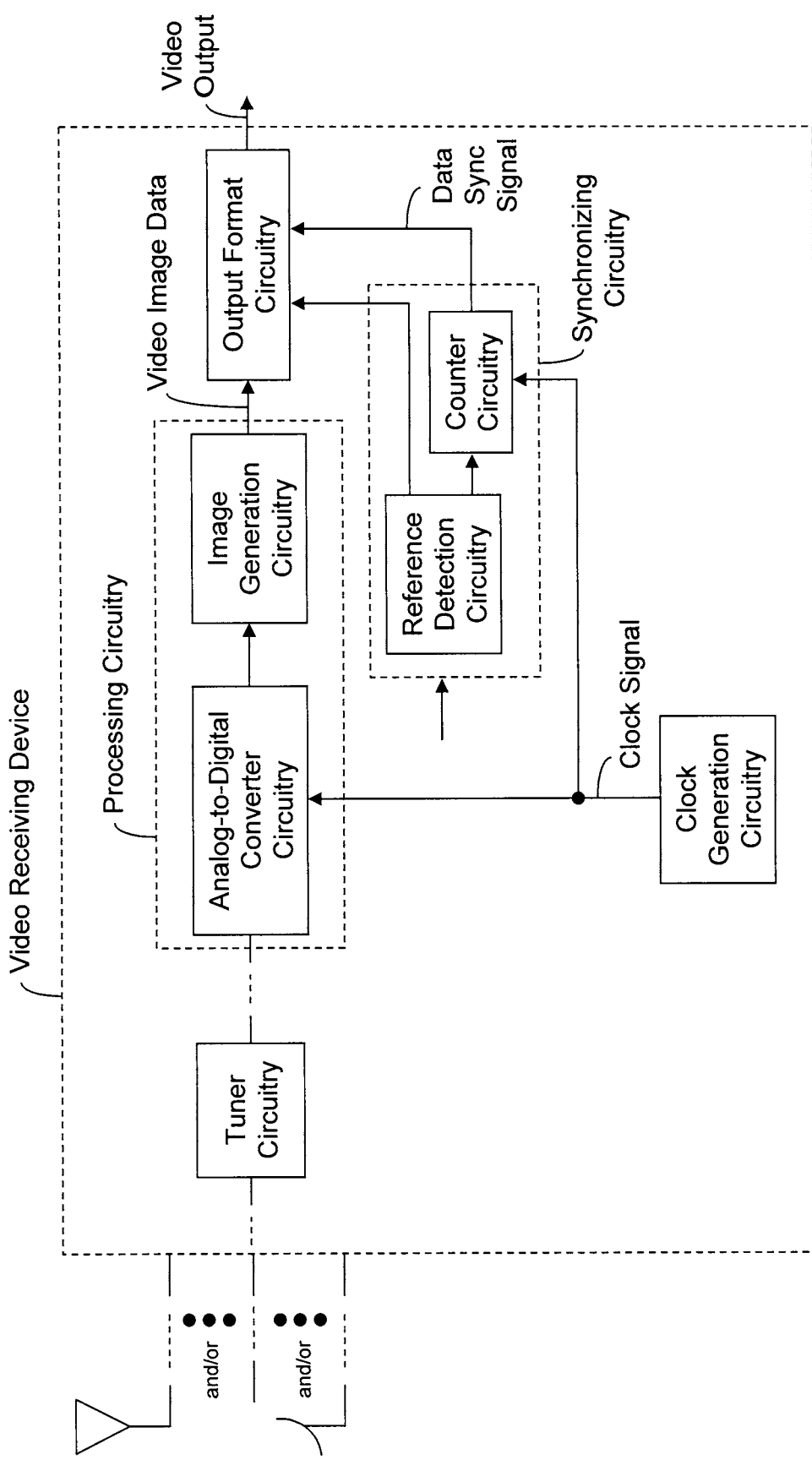

With reference to FIGS. 1E, 3E and 3F, in another embodiment, the (i) temporal characteristics of the timing signals and/or timing markers or tags and (ii) amount of video data formatted and output of the video data blocks (for example, a line of video data or frame of video data) may be predetermined and fixed. In this embodiment, although the number of asynchronous samples in the active video data block may vary based on (1) the sampling rate of the analog-to-digital converter circuitry and (2) the time interval between consecutive timing signals and/or timing markers or tags (for example, horizontal/vertical blanking signals in the underlying video stream), the video output data control circuitry in the output format circuitry may adjust the amount of video data formatted for each data block (for example, a line of video data or frame of video data) to a predetermined and fixed amount. For example, the video output data control circuitry may discard or add video data in one or more data blocks (for example, a line of video data or frame of video data) so that each data block includes the predetermined and fixed amount of video data. Notably, in this embodiment, the reference detection circuitry (see FIGS. 6A and 6B) may detect, determine and/or identify timing, clock or temporal reference information/signals of the selected video broadcast using an analog or digitized signal of, for example, the baseband video signal.

In one embodiment, the memory of the output format circuitry may include a plurality of parallel buffers, each holding a data block (for example, line of video data or frame of video data) and video output data control circuitry to address undersampling and oversampling of a video data block (for example, line of data or frame of data). In operation, where the analog-to-digital converter circuitry "undersamples" a video data block, the video output data control circuitry may add data (prior to outputting the video data) to provide or output video data blocks having the predetermined and fixed amount of data. However, where the analog-to-digital converter circuitry "oversamples" a video data block, the video output data control circuitry may discard additional samples and thereby provide or output video data blocks having the predetermined and fixed amount of data. Thus, in this embodiment, the video output data control circuitry configures the data block to a predetermined or fixed amount of video data, which was asynchronously digitized by the analog-to-digital converter circuitry, and controls the output of the format circuitry to provide such predetermined or fixed amount of video data regardless of the sampling rate of the analog-to-digital converter circuitry.

The synchronization circuitry, in this embodiment, provides information of the amount of samples per consecutive timing signals and/or timing markers or tags so that the video output data control circuitry may determine whether to add, discard to not change the amount of data in the output video data block. For example, where, the analog-to-digital converter circuitry "undersamples" or "overshoots" a video data block (due to the frequency of the local clock being lower than the timing, clock or temporal reference information/signals of the video broadcast), the output format circuitry may responsively add data (for example, data which when displayed provides a border) to provide or output video data blocks having the predetermined and fixed amount of data. In addition thereto, or in lieu thereof, circuitry may generate additional samples via, for example, interpolation of existing samples in order to generate or "regenerate" an effective "higher" number of samples to provide the fixed and predetermined number of samples.

In this regard, circuitry (for example, the output format circuitry) may (a) replace, substitute and/or change the value of the data samples which correspond to non-active video (for example, a succeeding blanking interval) with a predetermined or fixed value (for example, black) thereby providing a fixed color pixel corresponding to such data samples, and/or (b) interpolate data corresponding to the active video portion to generate video data which relates to the active video portion to thereby form a complete data block. For example, where the analog-to-digital converter circuitry generates 716 samples of real video data on a line and overshoots and acquires 4 samples in the horizontal blanking interval, the circuitry may substitute or replace the 4 data values (pixels values) by values that provide a predetermined or fixed color when displayed (for example, black). In addition thereto, or in lieu thereof, the circuitry may employ a plurality of the 716 samples of the active video and interpolate or re-interpolate the data to generate 4 additional data samples and thereby provide or "generate" 720 pixels from the 716 (for example, interpolate up to an effectively higher sampling rate). Under either example, the output format circuitry provides or outputs 720 "video" samples.

In one exemplary embodiment, the synchronization circuitry includes counter circuitry, which is coupled to the clock signal, to increment or decrement in response to a transition of the clock signal. (See, for example, FIGS. 1E and 3F). As noted above, the frequency of the sampling or digitizing by the analog-to-digital converter circuitry is provided to the output format circuitry via the count value, which is representative of a number of digitized samples of the baseband signal of the selected video broadcast. As such, in this embodiment both the (i) temporal characteristics of the timing signals and/or timing markers or tags and (ii) amount of video data formatted and output for the video data blocks (for example, a line of video data or frame of video data) are predetermined and fixed during operation.

The tuner circuitry, analog-to-digital converter circuitry, image generation circuitry, output format circuitry, and/or synchronization circuitry (or portions thereof) may be integrated or may be implemented using a plurality of discrete logic, whether a state machine, a processor (suitably programmed) and/or a field programmable gate array (or combinations thereof). For example, the tuner circuitry, analog-to-digital converter circuitry, image generation circuitry, clock generation circuitry, processing circuitry and output format circuitry may be portions of a monolithic integrated circuit device. All permutations and/or combinations of integrated, discrete, hardwired and programmable circuitry (which is programmed, for example, via software) for implementing the analog-to-digital converter circuitry, image generation circuitry, output format circuitry, and/or synchronization circuitry are intended to fall within the scope of the present inventions.

Moreover, tuner circuitry, analog-to-digital converter circuitry, image generation circuitry, output format circuitry, and/or synchronization circuitry may share circuitry with other elements of the video receiving device (or components thereof) and/or perform one or more other operations, which may be separate and distinct from that described herein. For example, where the synchronization circuitry is implemented via a special or general purpose processor (or controller), such special or general purpose processor (or controller) may also implement the image generation circuitry and/or output format circuitry.

Figure 11A:
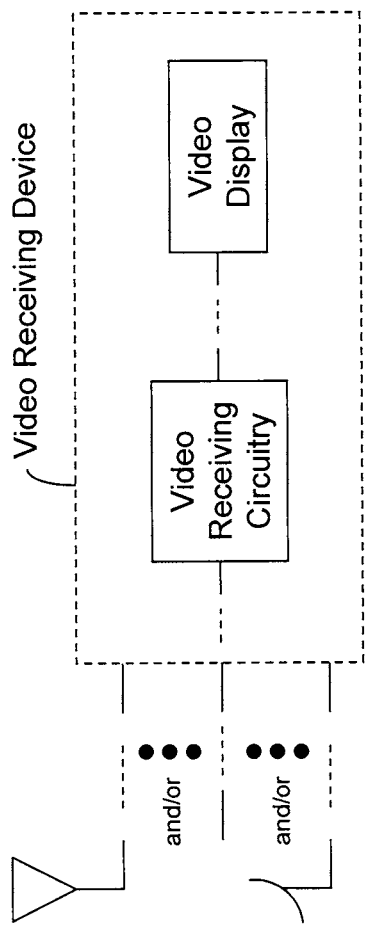
FIGS. 11A and 11B illustrate schematic block diagrams of exemplary video receiving device, according to at least one embodiment of at least one aspect of the present inventions, wherein such device includes a video display (FIG. 11A) or is coupled to a video display (FIG. 11B).

As mentioned above, the present inventions may be employed in a satellite, terrestrial and/or cable communications environments (among others). (See, for example, FIG. 11A). For example, the present inventions may be implemented in a satellite, terrestrial and/or cable digital television environment and/or receiver (for example, digital broadcasting TV receiver or mobile TV receiver). Moreover, video receiving device may output video data to display, processor circuitry (for example, a special purpose or general purpose processor), and/or a video recording device. (See, for example, FIG. 11B).

As noted above, the present inventions may be employed in conjunction with any analog or digital broadcast transmission regime and video standard (for example, NTSC, PAL, SECAM, ATSC or DVB-T) whether now known or later developed. Moreover, the circuitry according to the present inventions may output video data in accordance with any video data output standard (for example, standard RGB video output standard—whether in, for example, NTSC, PAL or SECAM analog standards or ATSC, ISDB, DVB, or ITU-R BT.601 digital standards), whether now known or later developed; all of which, when adaptively processed in accordance with or using the present inventions, are intended to fall within the scope of the present inventions.

For example, in the exemplary embodiments hereof, the circuitry described herein may be comprised of or include one or more (integrated or discrete) microprocessors, Application-Specific Integrated Circuits (ASICs), digital signal processors (DSPs), and/or programmable gate arrays (for example, field-programmable gate arrays (FPGAs)). Indeed, such circuitry may be any type or form of circuitry whether now known or later developed. For example, the circuitry may include a single component or a multiplicity of components (microprocessors, FPGAs, ASICs and DSPs), either active and/or passive, integrated or not, which are coupled together to implement, provide and/or perform a desired operation/ function/application; all of which are intended to fall within the scope of the present inventions. Moreover, all permutations and/or combinations of hardwired and programmable circuitry (which is programmed, for example, via software) for implementing the operations (for example, transmitting, receiving, decoding, processing and evaluating circuitry) within the video receiver device described herein are intended to fall within the scope of the present inventions.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

As noted above, the video receiving device may provide a predetermined or variable amount of video data regardless of the asynchronous synchronous sampling rate of the analog-to-digital converter circuitry (which is defined by the predetermined frequency of the clock signal. Moreover, the video receiving device may provide timing signals and/or timing markers or tags having predetermined or variable temporal characteristics regardless of the asynchronous sampling rate of the baseband signal of the selected video broadcast. As such, the video receiving device according to the present inventions may include predetermined or variable (i) temporal characteristics of the timing signals and/or timing markers or tags and/or (ii) amount of video data formatted and output for the video data blocks (for example, a line of video data or frame of video data).

For example, with reference to FIGS. 9A, 9B and 10A-10C, the amount of video data output for the video data blocks (for example, a line of video data or frame of video data) may be predetermined and fixed during operation and the length of time of the display timing signals may be variable. Where the frequency of the clock signal generated by the local clock generation circuitry is lower than, for example, the frequency of a nominal clock signal (which is, for example, temporally related to or synchronized with data which is representative of the frequency of the source clock which is provided with the source synchronous broadcast), a predetermined number of digitized samples of the baseband video signal are acquired in a greater amount of time than nominally necessary and the temporal characteristic of the display synchronization timing signal is less than the corresponding temporal characteristic of a nominal display synchronization timing signal. (See, for example, FIG. 9A—wherein the difference thereof is illustrated as "$-$"$\Delta t_{sync}$). Under those circumstances, where the frequency of the clock signal generated by the local clock generation circuitry is higher than, for example, the frequency of a nominal clock signal, a predetermined number of digitized samples of the baseband video signal are acquired in a less amount of time than nominally necessary and the temporal characteristic of the display synchronization timing signal is greater than the corresponding temporal characteristic of a nominal display synchronization timing signal. (See, FIG. 9B—wherein the difference thereof is illustrated as "$+$"$\Delta t_{sync}$.

Figure 11B:
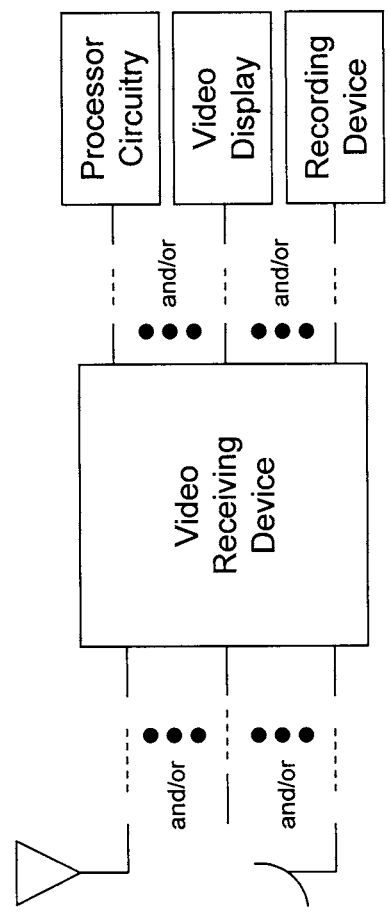

Further, in certain embodiments, the video receiving circuitry may include a video display (see FIG. 11A); and in other embodiments, the video receiving circuitry may couple to a video display which receives the video output, including, for example, video output data and display synchronization timing signal (see FIG. 11B).

Moreover, as noted above, the video receiving device may be employed in a satellite, terrestrial and/or cable communications environments (among others). (See, for example, FIG. 11A). For example, the present inventions may be implemented in a satellite, terrestrial and/or cable digital television environment and/or receiver (for example, a digital broadcast TV receiver or mobile TV receiver). Indeed, a video receiving device may output video data to display, processor circuitry (for example, a special purpose or general purpose processor), and/or a video recording device. (See, for example, FIG. 11A).

In addition, while some of the video processing described above may be asynchronous relative to the timing information in the source synchronous video broadcast (for example, digitizing of the baseband signal), other of the processing may be synchronous (and, indeed, employ the timing information in the source synchronous video broadcast). For example, the image generation circuitry may employ the timing information in the source synchronous video broadcast during processing of the digitized data to video image data.

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations are not discussed separately herein; however, all permutations and combinations are intended to fall within the scope of the present inventions.

As such, the embodiments described and/or illustrated of the present inventions are merely exemplary. They are not intended to be exhaustive or to limit the inventions to the precise circuitry, techniques, and/or configurations disclosed. Many modifications and variations are possible in light of the above teaching. It is to be understood that other embodiments may be utilized and operational changes may be made without departing from the scope of the present inventions. As such, the foregoing description of the exemplary embodiments of the inventions has been presented for the purposes of illustration and description. It is intended that the scope of the inventions not be limited solely to the description above.

It should be noted that the term "circuit" may mean, among other things, a single component (for example, electrical/electronic and/or microelectromechanical) or a multiplicity of components (whether in integrated circuit form or otherwise), which are active and/or passive, and which are coupled together to provide or perform a desired function. The term "circuitry" may mean, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" may mean, among other things, a current or voltage signal(s) whether in an analog or a digital form.

Notably, the various circuitry described and/or illustrated herein (or portions and/or combinations thereof) may be integrated or may be implemented using a plurality of discrete logic, whether a state machine, a special or general purpose processor (suitably programmed) and/or a field programmable gate array (or combinations thereof). All permutations and/or combinations of integrated, discrete, hardwired and programmable circuitry (which is programmed, for example, via software) for implementing the analog-to-digital converter circuitry, image generation circuitry, output format circuitry, and/or synchronization circuitry are intended to fall within the scope of the present inventions. For example, in one embodiment, the analog-to-digital converter circuitry, image generation circuitry, output format circuitry, and/or synchronization circuitry may be integrated on a monolithic integrated circuit device.

Moreover, the circuitry of the video receiving device may share circuitry with other elements of the video receiving device (or components thereof) and/or perform one or more other operations, which may be separate and distinct from that described herein. For example, the synchronization circuitry may share circuitry with the image generation circuitry and/or output format circuitry. Indeed, such circuitry may be implemented via one or more state machines, one or more processor (suitably programmed) and/or one or more field programmable gate arrays.

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits and circuitry, as well as techniques, disclosed herein may be represented via simulations using computer aided design and/or testing tools. The simulation of the video receiver device, video receiving circuitry and/or video processing circuitry (or portions of the foregoing), and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive video receiver device, video receiving circuitry (or portions the foregoing) and/or video processing circuitry, and/or techniques implemented thereby, and, as such, are intended to fall within the scope of the present inventions. The computer-readable media corresponding to such simulations and/or testing tools are also intended to fall within the scope of the present inventions.

What is claimed is:

1. A method of processing a video signal, the method comprising:

receiving the video signal of a source synchronous video broadcast which corresponds to a selected channel which is one of a plurality of channels of a broadcast spectrum, the video signal being analog signals, wherein the source synchronous video broadcast includes information which is representative of a frequency of a source clock, the method comprising:

generating digitized data of the video signal by sampling a first number of samples of the video signal, which corresponds to the source synchronous video broadcast, using a local clock signal having a frequency which is different from the frequency of the source clock of the source synchronous video broadcast, the local clock being associated with a sampling rate;

generating video data using the digitized data of the video signal which corresponds to the source synchronous video broadcast, the video data comprising a second number of samples of the video signal data, one or more samples of video signal data being modified if the first number is different from the second number;

generating formatted video data blocks by arranging the video data into one or more lines or frames of video data;

generating temporal reference signals wherein each temporal reference signal is associated with at least one formatted video data block; and outputting each formatted video data block and associated temporal reference signal.

2. The method of claim 1 wherein the temporal reference signals include at least one temporal reference signal which differs temporally in length relative to other temporal reference signals.

3. The method of claim 2 wherein each formatted video data block includes a predetermined, fixed amount of data.

4. The method of claim 1 wherein the formatted video data blocks include one or more formatted video data blocks which varying in an amount of data relative to other formatted video data blocks.

5. The method of claim 4 wherein the temporal reference signals include a predetermined, fixed temporal length.

6. The method of claim 1 further including generating the local clock signal, wherein the local clock signal includes a fixed frequency during operation.

7. The method of claim 1 further including generating the local clock signal, wherein the local clock signal includes a programmable frequency.

8. The method of claim 7 wherein the frequency of the local clock signal is programmable at start-up or during an initialization sequence.

9. The method of claim 1 wherein generating the temporal reference signals further includes generating the temporal reference signals using the information which is representative of the source clock of the source synchronous video broadcast.

10. The method of claim 1 wherein the formatted video data blocks include a predetermined, fixed amount of data.

11. The method of claim 10 wherein generating formatted video data blocks further includes generating the formatted video data blocks using information which correlates the local clock signal to the predetermined amount of data.

12. The method of claim 11 wherein the temporal reference signal associated with each formatted video data block includes a temporal length which changes in accordance with the frequency of the local clock signal.

13. The method of claim 1 wherein the temporal reference signals include a predetermined, fixed temporal length.

14. The method of claim 13 wherein generating formatted video data blocks further includes arranging the video data into one or more lines or frames of video data having a predetermined, fixed amount of video data and wherein, if the amount of video data in a given formatted video data block is different from the predetermined amount, adding or discarding video data in the given formatted video data block so that the amount of video data into the given formatted video data block is equal to the predetermined amount.

15. The method of claim 1 further including detecting timing signals, markers or tags included in source synchronous video broadcast and, wherein generating the digitized data further includes generating the digitized data corresponding to each formatted video data block synchronously with respect to detecting associated timing signals, markers or tags.

16. The method of claim 15 wherein generating formatted video data blocks further includes arranging the video data into one or more lines or frames of video data having a predetermined, fixed amount of video data and wherein, if the amount of video data in a given formatted video data block is different from the predetermined amount, adding or discarding video data into the given formatted video data block so that the amount of video data in the given formatted video data block is equal to the predetermined amount.

17. The method of claim 1 further including detecting timing signals, markers or tags included in source synchronous video broadcast and, wherein generating the digitized data further includes initiating the generating digitized data corresponding to each formatted video data block synchronously with respect to detecting timing signals, markers or tags included in source synchronous video broadcast.

18. The method of claim 17 wherein generating formatted video data blocks further includes arranging the video data into one or more lines or frames of video data having a predetermined, fixed amount of video data.

19. The method of claim 18 wherein each temporal reference signal includes a temporal length which depends on or changes in accordance with the frequency of the local clock signal.

20. The method of claim 1 further including displaying the formatted video data blocks in accordance with the associated temporal reference signals.

21. A video processing device to process a video signal of a source synchronous video broadcast which corresponds to a selected channel which is one of a plurality of channels of a broadcast spectrum, wherein the source synchronous video broadcast includes information which is representative of a frequency of a source clock, the video processing device comprising:
    tuner circuitry to convert the video signal of the source synchronous video broadcast of the selected channel to a baseband video signal, the video signal being an analog signal;
    clock generation circuitry to generate a local clock signal;
    processing circuitry, coupled to the tuner circuitry and the clock generation circuitry, to:
        asynchronously, with respect to the source clock of the source synchronous video broadcast, digitize the baseband video signal using the local clock signal by sampling a first number of samples of the video signal at a sampling rate, wherein the local clock signal includes a frequency which is different from the frequency of the source clock, the sampling rate being associated with local clock signal, and
        generate video data using the digitized data which corresponds to the video signal of the source synchronous video broadcast of the selected channel, the video data comprising a second number of samples of the video signal data, one or more samples of video signal data being modified if the first number is different from the second number; and
    output format circuitry, coupled to the processing circuitry, to generate formatted video data blocks by arranging the video data into one or more lines or frames of video data.

22. The video processing device of claim 21 wherein the output format circuitry further generates a plurality of temporal reference signals wherein each temporal reference signal is associated with at least one formatted video data block.

23. The video processing device of claim 22 further including a video display, to receive the formatted video data blocks and display the formatted video data blocks in accordance with the associated temporal reference signals.

24. The video processing device of claim 22 wherein one or more of the temporal reference signals vary in length of time relative to other temporal reference signals of the plurality of temporal reference signals.

25. The video processing device of claim 21 wherein the output format circuitry generates and outputs formatted video data blocks having a predetermined, fixed amount of data.

26. The video processing device of claim 25 wherein the output format circuitry further generates a plurality of temporal reference signals wherein each temporal reference signal (i) is associated with at least one formatted video data block and (ii) includes a varying temporal length which depends on the frequency of the local clock signal.

27. The video processing device of claim 21 wherein the output format circuitry generates and outputs formatted video data blocks having a variable amount of data.

28. The video processing device of claim 27 wherein the output format circuitry further generates a plurality of temporal reference signals wherein each temporal reference signal (i) is associated with at least one formatted video data block and (ii) includes a predetermined, fixed temporal length.

29. The video processing device of claim 21 wherein the local clock signal includes a fixed frequency.

30. The video processing device of claim 29 wherein the clock generation circuitry is hardwired to generate the local clock signal having the fixed frequency.

31. The video processing device of claim 21 wherein the local clock signal includes a programmable frequency.

32. The video processing device of claim 31 wherein the clock generation circuitry is programmable at start-up or during an initialization sequence to generate the local clock signal having the programmable frequency.

33. The video processing device of claim 21 further including detection circuitry to detect timing signals, markers or tags included in source synchronous video broadcast and, wherein the processing circuitry initiates digitizing of the baseband video signal corresponding to each formatted video data block synchronously with respect to the detection of associated timing signals, markers or tags included in source synchronous video broadcast.

34. The video processing device of claim 21 wherein the output format circuitry:
generates the formatted video data blocks by arranging the video data into one or more lines or frames of video data having a predetermined and fixed amount of video data, and
generates a plurality of temporal reference signals wherein each temporal reference signal is associated with at least one formatted video data block and the temporal reference signals include one or more temporal reference signals which temporally varying in length relative to other temporal reference signals.

35. The video processing device of claim 21 wherein the tuner circuitry, processing circuitry and output format circuitry are portions of a monolithic integrated circuit device.

36. A machine readable storage medium having information stored thereon comprising data representing an expression of a video processing device to process a video signal of a source synchronous video broadcast which corresponds to a selected channel which is one of a plurality of channels of a broadcast spectrum, wherein the source synchronous video broadcast includes information which is representative of a frequency of a source clock, the expression of the video processing circuitry comprising:
tuner circuitry to convert the video signal of the source synchronous video broadcast of the selected channel to a baseband video signal, the video signal being an analog signal;
clock generation circuitry to generate a local clock signal;
processing circuitry, coupled to the tuner circuitry and the clock generation circuitry, to:
asynchronously, with respect to the source clock of the source synchronous video broadcast, digitize the baseband video signal using the local clock signal by sampling a first number of samples of the video signal at a sampling rate, wherein the local clock signal includes a frequency which is different from the frequency of the source clock, the sampling rate being associated with the local clock signal, and
generate video data using the digitized data which corresponds to the video signal of the source synchronous video broadcast of the selected channel, the video data comprising a second number of samples of the video signal data, one or more samples of video signal data being modified if the first number is different from the second number; and
output format circuitry, coupled to the processing circuitry, to generate formatted video data blocks by arranging the video data into one or more lines or frames of video data.

37. A method of testing a video processing device which processes a video signal of a source synchronous video broadcast which corresponds to a selected channel which is one of a plurality of channels of a broadcast spectrum, the video signal being an analog signal, wherein the source synchronous video broadcast includes information which is representative of a frequency of a source clock, the method of testing a video processing device comprises:
generating digitized data of the video signal by sampling a first number of samples of the video signal at a sampling rate, which corresponds to the source synchronous video broadcast, using a local clock signal having a frequency which is different from the frequency of the source clock, the sampling rate being associated with the local clock signal;
generating video data using the digitized data of the video signal, which corresponds to the source synchronous video broadcast, the video data comprising a second number of samples of the video signal data, one or more samples of video signal data being modified if the first number is different from the second number;
generating formatted video data blocks by arranging the video data into one or more lines or frames of video data;
generating temporal reference signals wherein each temporal reference signal is associated with at least one formatted video data block; and
outputting of each formatted video data block and associated temporal reference signal.

38. The method of claim 37 further including displaying the formatted video data blocks in accordance with the associated temporal reference signals.

39. A method of simulating on a computing system a video processing device which processes a video signal of a source synchronous video broadcast which corresponds to a selected channel which is one of a plurality of channels of a broadcast spectrum, the video signal being an analogy signal, wherein the source synchronous video broadcast includes information which is representative of a frequency of a source clock, the method comprising:
simulating generation of digitized data of the video signal by sampling a first number of samples of the digitized data at a sampling rate, which corresponds to the source synchronous video broadcast, using a local clock signal having a frequency which is different from the frequency of the source clock, the sampling rate being associated with the local clock signal;
simulating generation of video data using the digitized data of the video signal, which corresponds to the source synchronous video broadcast, the video data comprising a second number of samples of the video signal data, one or more samples of video signal data being modified if the first number is different from the second number;
simulating generation of formatted video data blocks by arranging the video data into one or more lines or frames of video data;
simulating generation of temporal reference signals wherein each temporal reference signal is associated with at least one formatted video data block; and
simulating output of each formatted video data block and associated temporal reference signal.

40. The method of claim 37 further including simulating display of the formatted video data blocks in accordance with the associated temporal reference signals.

* * * * *